United States Patent
Brück et al.

(10) Patent No.: US 8,155,509 B2
(45) Date of Patent: *Apr. 10, 2012

(54) METHOD AND DEVICE FOR PROVIDING A GASEOUS SUBSTANCE MIXTURE

(75) Inventors: Rolf Brück, Bergisch Gladbach (DE); Marc Brugger, Neunkirchen (DE); Thomas Härig, Neunkirchen-Seelscheid (DE); Peter Hirth, Rösrath (DE); Ulf Klein, Neunkirchen-Seelscheid (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 11 days.

This patent is subject to a terminal disclaimer.

(21) Appl. No.: 12/272,384

(22) Filed: Nov. 17, 2008

(65) Prior Publication Data

US 2009/0127511 A1    May 21, 2009

Related U.S. Application Data

(63) Continuation of application No. PCT/EP2007/004358, filed on May 16, 2007.

(30) Foreign Application Priority Data

May 16, 2006 (DE) .......................... 10 2006 023 147

(51) Int. Cl.
*D06F 75/00* (2006.01)
*B01D 53/56* (2006.01)
*C01C 3/00* (2006.01)
(52) U.S. Cl. .................... 392/403; 423/238; 423/235
(58) Field of Classification Search .................. None
See application file for complete search history.

(56) References Cited

U.S. PATENT DOCUMENTS 5,296,206 A * 3/1994 Cho et al. .................. 423/235
5,728,357 A * 3/1998 von Harpe .............. 423/239.1
(Continued)

FOREIGN PATENT DOCUMENTS

DE            40 38 054 A1    6/1992
(Continued)

OTHER PUBLICATIONS

International Search Report, dated Jul. 24, 2007.
(Continued)

*Primary Examiner* — Melvin Mayes
*Assistant Examiner* — Sheng H Davis
(74) *Attorney, Agent, or Firm* — Laurence A. Greenberg; Werner H. Stemer; Ralph E. Locher

(57) ABSTRACT

A device and method for providing a gaseous substance mixture which includes at least one reducing agent and/or at least one reducing agent precursor, includes a reservoir for an aqueous solution which includes at least one reducing agent precursor that can be flow connected to an evaporator chamber, and a device for dosing the aqueous solution in the evaporator chamber. A device can heat the evaporator chamber to a temperature higher than or equal to a critical temperature, in which the aqueous solution is at least partially evaporated. The device and method enable reducing agent to be provided for selective catalytic reduction of nitrogen oxides in the exhaust of an internal combustion engine. Preferably, an evaporator unit is configured as the evaporator chamber and a hydrolysis catalytic converter is disposed outside the exhaust system. As a result, the size of the hydrolysis catalytic converter is reduced, allowing compact construction.

9 Claims, 12 Drawing Sheets

U.S. PATENT DOCUMENTS

| | | |
|---|---|---|
| 6,928,807 B2 | 8/2005 | Jacob et al. |
| 7,220,395 B2 | 5/2007 | Cooper, Sr. et al. |
| 7,294,313 B2 | 11/2007 | Jacob et al. |
| 7,509,799 B2 | 3/2009 | Amou et al. |
| 2003/0213234 A1* | 11/2003 | Funk et al. .................. 60/286 |
| 2004/0115110 A1 | 6/2004 | Ripper et al. |
| 2004/0247302 A1* | 12/2004 | Toya et al. .................. 392/397 |
| 2007/0003458 A1* | 1/2007 | Gschwind .................. 422/199 |
| 2007/0036694 A1 | 2/2007 | Nishioka et al. |
| 2007/0231232 A1* | 10/2007 | Lin et al. .................. 423/235 |
| 2008/0250779 A1 | 10/2008 | Bruck et al. |

FOREIGN PATENT DOCUMENTS

| | | |
|---|---|---|
| DE | 42 00 514 A1 | 7/1993 |
| DE | 199 13 462 A1 | 9/2000 |
| DE | 101 54 421 A1 | 5/2003 |
| DE | 102 06 028 A1 | 8/2003 |
| DE | 10 2004 042 225 A1 | 3/2006 |
| EP | 1 092 466 A2 | 4/2001 |
| EP | 1481719 * | 1/2004 |
| EP | 1 748 162 A1 | 1/2007 |
| JP | 4358521 A | 12/1992 |
| JP | 6165913 A | 6/1994 |
| JP | 8057258 A | 3/1996 |
| JP | 2004353523 A | 12/2004 |
| WO | 98/42623 A1 | 10/1998 |
| WO | 99/56858 A2 | 11/1999 |
| WO | 2006/108566 A1 | 10/2006 |

OTHER PUBLICATIONS

Artobolevskij, "Politekhnicheskij Slovar", Sovetskaja Entsiklopedia, Moscou, 1972, p. 242—Statement of Relevance.

* cited by examiner

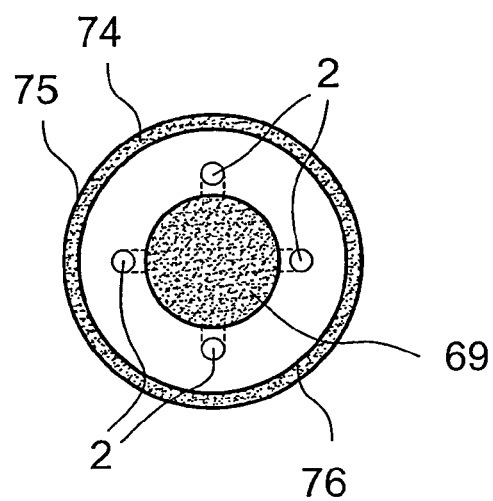
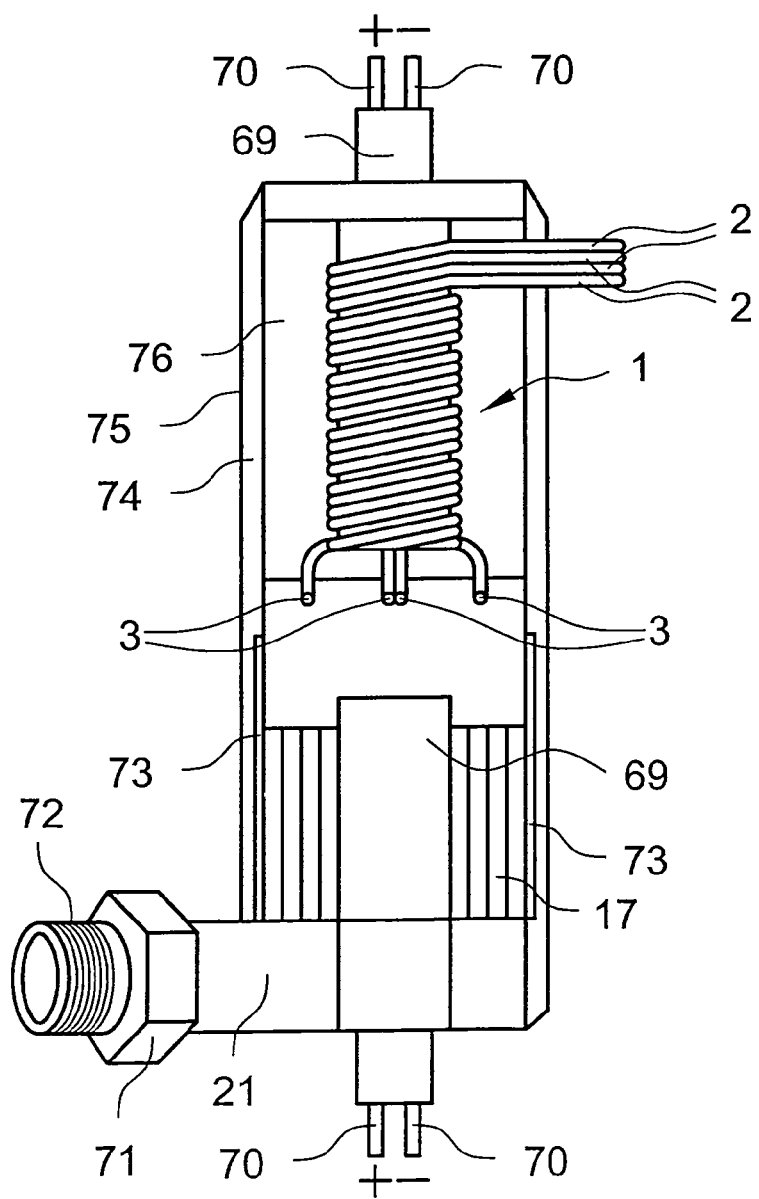

METHOD AND DEVICE FOR PROVIDING A GASEOUS SUBSTANCE MIXTURE

CROSS-REFERENCE TO RELATED APPLICATIONS

This is a continuation, under 35 U.S.C. §120, of copending International Application No. PCT/EP2007/004358, filed May 16, 2007, which designated the United States; this application also claims the priority, under 35 U.S.C. §119, of German Patent Application DE 10 2006 023 147.3, filed May 16, 2006; the prior applications are herewith incorporated by reference in their entirety.

BACKGROUND OF THE INVENTION

Field of the Invention

The present invention relates to a method and a device for providing a gaseous substance mixture including at least one of the following substances:
   a) at least one reducing agent, and
   b) at least one reducing agent precursor.

The present invention can particularly advantageously be used for providing reducing agents during the selective catalytic reduction of nitrogen oxides in the exhaust system of internal combustion engines.

The emission into the environment of substances contained in the exhaust gas from internal combustion engines, is undesirable. In many countries, for example, nitrogen oxides ($NO_x$) may only be contained in the exhaust gas of an internal combustion engine up to a certain limit value. In addition to engine-internal measures, through the use of which the emissions of nitrogen oxides can be reduced by the use of a selection of a suitable operating point of the internal combustion engine, aftertreatment methods have been established which make a further reduction of the nitrogen oxide emissions possible.

One option for further reducing the nitrogen oxide emissions is so-called selective catalytic reduction (SCR). In that case, a selective reduction of the nitrogen oxides to molecular nitrogen ($N_2$) takes place by using a selectively acting reducing agent. One possible reducing agent is ammonia ($NH_3$). In that case, ammonia is often stored not in the form of ammonia but instead, an ammonia precursor is stored, which is converted to ammonia when required. Possible ammonia precursors are, for example, urea (($NH_2)_2CO$), ammonium carbamate, isocyanic acid (HCNO), cyanuric acid and the like.

Urea, in particular, has proven to be simple to store. Urea is preferably stored in the form of a urea/water solution. Urea and, in particular, urea/water solution is hygienically harmless, simple to distribute and to store. A urea/water solution of that type is already marketed under the trademark "AdBlue".

German Published, Non-Prosecuted Patent Application DE 199 13 462 A1 discloses a method in which a urea/water solution is dosed, upstream of a hydrolysis catalytic converter, into a partial flow of exhaust gas of an internal combustion engine. As it impinges on the hydrolysis catalytic converter, the urea is hydrolyzed and thermolyzed to form ammonia, which is used as a reducing agent in an SCR catalytic converter situated downstream. The method described therein has the disadvantage that the hydrolysis catalytic converter is cooled by the evaporation of the urea/water solution. In particular, where large quantities of ammonia are required, it is possible at least in regions of the hydrolysis catalytic converter, for such intense cooling to take place that, in such a case, the hydrolysis reaction no longer takes place or no longer takes place completely. Furthermore, the locally intensely discontinuous cooling may result in damage to the hydrolysis catalytic converter and in particular to a breakdown of a catalytically active coating.

SUMMARY OF THE INVENTION

It is accordingly an object of the invention to provide a method and a device for providing a gaseous substance mixture, which overcome or at least alleviate the hereinafore-mentioned disadvantages of the heretofore-known methods and devices of this general type.

With the foregoing and other objects in view there is provided, in accordance with the invention, a device for providing a gaseous substance mixture which includes at least one of the following substances:
   a) at least one reducing agent, or
   b) at least one reducing agent precursor.

The device comprises a reservoir for an aqueous solution which includes at least one reducing agent precursor, an evaporator chamber to be flow-connected to the reservoir, a device for dosing the aqueous solution into the evaporator chamber, and a device for heating the evaporator chamber to a temperature greater than or equal to a critical temperature at which the aqueous solution is at least partially evaporated.

The aqueous solution particularly preferably includes urea as a reducing agent precursor, and the gaseous substance mixture includes ammonia and/or urea. A corresponding aqueous solution is marketed under the trademark "AdBlue". Furthermore, the aqueous solution may include further substances which serve, for example, to reduce the melting point of the solution. The aqueous solution may, in particular, include formic acid and/or ammonium formate. A corresponding aqueous solution is marketed under the trademark "Denoxium". A flow connection between the reservoir and the evaporator chamber is to be understood, in particular, to mean that a fluid can flow from the reservoir to the evaporator chamber. The reservoir and the evaporator chamber may, in particular, be connected through the use of a delivery line through which the aqueous solution can flow during operation. The critical temperature is particularly preferably selected such that a complete evaporation of the aqueous solution takes place. A reducing agent precursor is to be understood, in particular, to mean a substance which cleaves the reducing agent or can be converted into the reducing agent. The device for dosing the aqueous solution into the evaporator chamber is, in particular, constructed in such a way that the dosing takes place by the deposition of individual droplets or of a droplet stream into the evaporator chamber. The device for dosing includes, in particular, a correspondingly-constructed nozzle.

Through the use of the device according to the invention, it is particularly advantageously possible for a reducing agent for use in an SCR catalytic converter to be provided in gaseous form. The metering of the gaseous substance mixture preferably takes place in an exhaust system upstream of a hydrolysis catalytic converter. Within the context of this invention, a catalytic converter is to be understood, in particular, as a catalyst carrier body which is provided with a corresponding catalytically active coating. A hydrolysis catalytic converter thereby constitutes, for example, a catalyst carrier body which is provided with a coating that catalyzes a hydrolysis of the reducing agent precursor. An SCR catalytic converter constitutes a catalyst carrier body which is provided with a catalytically active coating that catalyzes the selective catalytic reduction of nitrogen oxides.

By using the device according to the invention, it is thus advantageously possible to prevent the hydrolysis catalytic converter from being significantly cooled as the reducing agent precursor impinges on it, since the hydrolysis catalytic converter need not impart the evaporation enthalpy of the aqueous solution. In this way, the damaging consequences of local cooling of the hydrolysis catalytic converter can be avoided. It is thus possible, in particular to ensure that, even with relatively large quantities of reducing agent precursor or aqueous solution which impinges on the hydrolysis catalytic converter, the hydrolysis catalytic converter is not intensely cooled to such an extent that only incomplete hydrolysis takes place.

It is also particularly preferable to provide a device for the selective catalytic reduction of nitrogen oxides in the exhaust gas of an internal combustion engine, in which a device is provided for preparing or providing a gaseous substance mixture including at least one of the following substances:

a) ammonia
b) urea.

A reservoir for an aqueous urea solution can be flow-connected to an evaporator chamber. A device for heating the evaporator chamber can heat the evaporator chamber to a temperature greater than or equal to a critical temperature at which the aqueous solution is at least partially evaporated. A hydrolysis catalytic converter is preferably provided downstream of the device for providing a gaseous substance mixture. The hydrolysis catalytic converter is in turn preferably provided upstream of an SCR catalytic converter.

According to one advantageous refinement of the device according to the invention, the evaporator chamber encompasses a substantially closed volume which has only a first opening for connecting a delivery line for the aqueous solution, and a second opening for connecting a metering line for discharging the gaseous substance mixture.

It is alternatively preferable for the evaporator chamber to encompass a substantially closed volume which has only a first opening for connecting a delivery line for the aqueous solution, a second opening for connecting a metering line for discharging the gaseous substance mixture, and a third opening for metering exhaust gas.

In other words, the aqueous solution can be introduced into the evaporator chamber through the delivery line and the gaseous substance mixture can be discharged from the evaporator chamber, and supplied to an exhaust system, in particular upstream of a hydrolysis catalytic converter, through the metering line. A connection to the exhaust gas line can be produced through the use of the third opening.

A closed volume means, in particular, that the volume is specifically not a catalyst carrier body which is, for example heated, but rather that a further component is provided in this case which is substantially closed. The cross sections of the first and second openings together preferably amount to at most 10% of the surface area of the evaporator chamber.

According to one advantageous embodiment of the device according to the invention, the device for heating the evaporator chamber includes at least one of the following components: a) an electrical resistance heater and/or b) a burner for burning a fuel.

The electrical resistance heater preferably includes a heating wire which is in thermal contact with the evaporator chamber. It is particularly preferable in this connection that the heating wire is wound around the evaporator chamber or the heating wire is formed into the wall of the evaporator chamber. The electrical resistance heater is therefore particularly preferable because it can be regulated in a very simple manner and can be regulated in a highly dynamic manner, in particular with a corresponding construction of the evaporator chamber with regard to the selection of the material and thickness of the material. This means that the output of the gaseous substance mixture can be adapted very quickly to the demand for reducing agent in the exhaust system of an internal combustion engine. It is alternatively and/or additionally possible for the device for heating the evaporator chamber to include a Peltier element and/or to utilize the waste heat from other components.

A Peltier element is to be understood, in particular, as an electrical component which, when a current is passed through it, generates a temperature difference based on the so-called Peltier effect. A Peltier element preferably includes one or more elements made from p-doped and n-doped semiconductor material which are connected to one another alternately through the use of electrically conductive material. The sign of the temperature difference is dependent on the direction of the current flow, so that both cooling and heating can be provided by a Peltier element. A fuel is to be understood in particular as hydrocarbons and/or hydrogen. Hydrocarbons may be extracted from the corresponding tank of the internal combustion engine.

According to a further advantageous embodiment of the device according to the invention, the evaporator chamber is substantially spherically symmetrical.

It has been found that, with a substantially spherically symmetrical construction of the evaporator chamber, it is possible to obtain very uniform heating of the volume in the evaporator chamber. An evaporator chamber volume which is heated in as uniform a manner as possible is preferable because the formation of regions of relatively low temperature is avoided in this way, since in the regions, droplets often form from condensed reducing agent precursor. The droplets can possibly precipitate in the interior of the evaporator chamber or be discharged through the metering line into the exhaust system. A substantially spherically symmetrical evaporator chamber advantageously makes it possible to provide the most uniform possible temperature control within the evaporator chamber.

In this connection, it is particularly advantageous if the evaporator chamber has a radius of 2 mm to 10 mm.

The radii proposed in this case have proven to be particularly advantageous since it was possible in this case to obtain fast, reliable and flexibly dynamic regulation of the output of a gaseous substance mixture with a relatively small input of power, for example of an electrical resistance heater. Radii of 2 mm and greater are fundamentally possible and encompassed by the invention. A radius of 3 to 4 mm has, for example, proven to be particularly advantageous. The corresponding radius can be adapted to the maximum required quantity of reducing agent or to the maximum quantity of aqueous solution which is to be evaporated, such that a radius of 2 to 35 mm is advantageous, for example for use in a passenger motor vehicle, while a radius of 50 to 150 mm is advantageous for use in trucks or utility vehicles.

According to a further advantageous embodiment of the device according to the invention, the evaporator chamber has a volume of 30 to 4,000 $mm^3$.

The volume of the evaporator chamber is, in particular, selected in such a way that a sufficiently large quantity of the gaseous substance mixture can be provided even in maximum-load states of the internal combustion engine, such that sufficient reducing agent is available for the selective catalytic reduction (SCR). The evaporator chamber volume in the exhaust system of passenger motor vehicles is, in particular, up to 150 ml, preferably approximately 100 $mm^3$ to 500 $mm^3$.

For the exhaust system of trucks or utility vehicles, the volume of the evaporator chamber is preferably in a range of up to 750 ml.

According to a further advantageous embodiment of the device according to the invention, the device for heating the evaporator chamber may impart a heating power of up to 5,000 W (Watts).

These heating power levels have proven to be particularly advantageous since, at these heating power levels, even peaks in the demand for reducing agent can be met through the use of a corresponding provision of a corresponding volume of the gaseous substance mixture. In the exhaust system of passenger motor vehicles in particular, a heating power of up to 500 W has proven to be advantageous, while for trucks or utility vehicles, the heating power is preferably in a range of up to 1,500 W.

According to a further advantageous embodiment of the device according to the invention, a delivery line for delivering the aqueous solution into the evaporator chamber is provided. The delivery line connects the evaporator chamber to a reservoir, and a delivery device is also provided with which the fluid can be delivered through the delivery line.

The delivery device may, in particular, be a pump. Alternatively or in addition to this, it is also possible for the aqueous solution to be delivered solely due to hydrostatic pressure, whereby the reservoir is thus configured so as to be higher than the evaporator chamber so that a filling of the evaporator chamber takes place solely due to the height difference between the reservoir and the evaporator chamber. The regulation of the quantity of aqueous solution entering the evaporator chamber may take place through the use of the regulation of the pump and/or through the use of a corresponding valve.

The pump which is used may, in particular, be a pump which can be dosed with a high degree of precision and which permits a wide range of delivery capacity.

According to a further advantageous embodiment of the device according to the invention, the device is constructed in such a way that, in operation, the temperature of the evaporator chamber is at most 25° C. above and below a mean temperature.

In this case, a temperature of the evaporator chamber is to be understood in particular to mean a temperature of the wall of the evaporator chamber. Precise temperature control of the evaporator chamber has proven in tests to be particularly important since a precipitation of reducing agent or by-products can be effectively prevented or at least restricted through the use of as uniform a temperature control as possible. It has been found that even only a relatively slight deviation from the mean-critical-temperature is sufficient to cause undesired substances to precipitate. The construction of the device includes, in particular, a corresponding construction of the device for heating the evaporator chamber. The device is, in particular, constructed in such a way that a very uniform introduction of energy into the evaporator chamber takes place. For example, the evaporator chamber may advantageously be surrounded by a heat conductor. It is also advantageously possible, through the use of a selection of a corresponding material, to obtain very uniform temperature control of the evaporator chamber.

According to a further advantageous refinement of the device according to the invention, the evaporator chamber has, at least in partial regions, a device for increasing the wetting capacity of the surface.

This device may, in particular, be a corresponding structuring of the surface of the evaporator chamber. The structuring may, for example, include macroscopic structures or else a corresponding coating. The evaporator chamber may, in particular, at least in partial regions, include a hydrolysis catalyst coating which catalyzes the hydrolysis, in particular of urea to form ammonia.

With the objects of the invention in view, there is also provided a method for providing a gaseous substance mixture which includes at least one of the following substances:

a) at least one reducing agent, or b) at least one reducing agent precursor.

The method comprises delivering an aqueous solution of at least one reducing agent precursor into an evaporator chamber, and heating the evaporator chamber to completely evaporate the aqueous solution to form the gaseous substance mixture.

The heating of the evaporator chamber takes place, in particular, in such a way that, in addition to an evaporation of the reducing agent precursor in the aqueous solution, an at least partial thermolytic decomposition of the reducing agent precursor to form a reducing agent takes place. The method according to the invention may preferably be carried out in a device according to the invention. Complete evaporation is to be understood, in particular, to mean an evaporation of at least 90% by weight, preferably 95% by weight, particularly preferably at least 98% by weight of the aqueous solution.

The aqueous solution is preferably delivered into the evaporator chamber in droplet form, in particular in the form of individual droplets and/or in the form of a droplet stream. The delivery may, in particular, be carried out through the use of a correspondingly-constructed and controllable nozzle.

According to one advantageous refinement of the method according to the invention, the evaporator chamber encompasses a substantially closed volume which has only a first opening for connecting a delivery line for the aqueous solution, and a second opening for connecting a metering line for discharging the gaseous substance mixture.

It is alternatively possible for the evaporator chamber to encompass a substantially closed volume which has only a first opening for connecting a delivery line for the aqueous solution, a second opening for connecting a metering line for discharging the gaseous substance mixture, and a third opening for metering exhaust gas.

The implementation of the method in such a way that a substantially closed evaporator volume is used for evaporating the aqueous solution advantageously permits an implementation of the method in which a relatively high vapor yield of the aqueous solution can be obtained with a relatively low input of energy. The method is, in particular, implemented in such a way that the heating and the evaporation of the aqueous solution take place through the walls of the substantially closed evaporator volume. According to the invention, the evaporator chamber is not filled with the liquid aqueous solution, but rather only droplets of the aqueous solution are dosed or injected. It is possible, in this case in particular, for a nozzle to be provided which injects the aqueous solution into the evaporator volume. Highly uniform evaporation of the aqueous solution can be ensured as a result of the substantially closed evaporator volume of the evaporator chamber.

According to a further advantageous refinement of the method according to the invention, the evaporator chamber is heated through the use of an electrical resistance heater.

Alternatively or in addition to this, it is possible to use a further device for heating the evaporator chamber. This device may, in particular, be the waste heat of other components or else an additional burner which is operated with fuel and which heats the evaporator chamber. It is also possible for at least one Peltier element to be used for the temperature control of the evaporator chamber. In this case, temperature control is to be understood, in particular, to mean heating or cooling.

According to a further advantageous refinement of the method according to the invention, the temperature control of the evaporator chamber takes place in a regulated fashion.

It is possible, in particular, for a regulating loop to be provided which, through the use of at least one thermal element, determines the temperature at or in the evaporator chamber, and carries out corresponding regulation. It is also possible to provide other temperature sensors, from the values of which it is possible to calculate the temperature in the evaporator chamber. For this purpose, it is possible in particular, to resort to mathematical models which have been formed of the corresponding system. In addition to pure regulation of the heating of the evaporator chamber, it is possible for further elements to be alternatively or additionally incorporated into the regulating circuit. In this case, it is possible in particular, for the temperature of a hydrolysis catalytic converter which is situated downstream to likewise be regulated.

According to a further advantageous refinement of the method according to the invention, the evaporator chamber is heated to a mean temperature of 350 to 450° C., preferably approximately 370 to 390° C., in particular approximately 380° C.

The temperatures advantageously permit an evaporation of 90% by weight and more, preferably 95% by weight and more, particularly preferably 98% by weight and more of the aqueous solution.

According to a further advantageous refinement of the method according to the invention, the evaporator chamber is heated to a mean temperature which is not deviated from at any point or location of the evaporator chamber by more than +25° C. or −25° C.

This may be obtained through the use of a very uniform connection of the evaporator chamber to a corresponding heat conductor. It is alternatively also possible for the surface of the evaporator chamber to be divided into a plurality of different heating zones which are regulated separately so as to permit a very fine adjustment of the temperature of the evaporator chamber. The temperature or the mean temperature of the evaporator chamber is to be understood, in particular, to mean the temperature at the outer or inner surface of the evaporator chamber. The very precise regulation, according to the invention, of the temperature of the evaporator chamber, which permits a range of fluctuation of only a maximum of +/−5° C. about a mean temperature, advantageously permits a method implementation in which the probability of the reducing agent, the reducing agent precursor or else a product generated during an undesired secondary reaction, precipitating on the surface of the evaporator chamber, is very low. Astonishingly, tests have shown that even very slight deviations from the mean temperature in individual regions of the evaporator chamber can lead to a precipitation of substances. Very precise temperature control and regulation is therefore advantageous.

The details and advantages disclosed for the device according to the invention can also be transferred and applied to the method according to the invention. The details and advantages disclosed for the method according to the invention can also be transferred and applied to the device according to the invention.

Other features which are considered as characteristic for the invention are set forth in the appended claims.

Although the invention is illustrated and described herein as embodied in a method and a device for providing a gaseous substance mixture, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF SEVERAL VIEWS OF THE DRAWINGS

FIGS. 19 and 20 are respective perspective and cross-sectional views of a further exemplary embodiment of a device for providing a gaseous substance mixture;

DETAILED DESCRIPTION OF THE INVENTION

Figure 1:
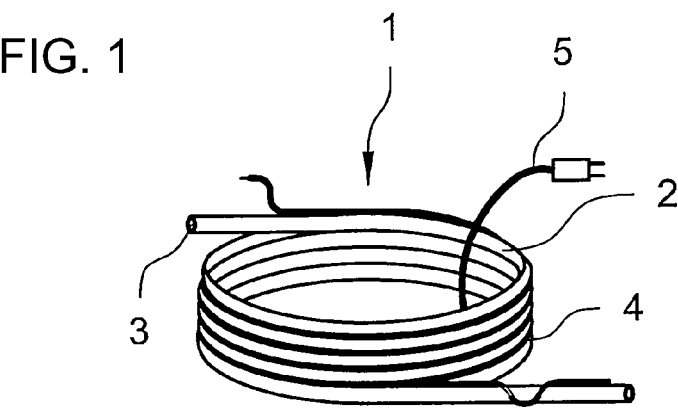
FIG. 1 is a diagrammatic, perspective view of a device for providing a gaseous substance mixture in a first embodiment of the invention.

Referring now to the figures of the drawings in detail and first, particularly, to FIG. 1 thereof, there is seen a diagrammatic illustration of a device 1 for providing a gaseous substance mixture including at least one of the following substances:

a) at least one reducing agent, and b) at least one reducing agent precursor.

These are, in particular, the reducing agent ammonia and the reducing agent precursor urea. The device 1 includes a metering line 2 with a dispensing opening 3. Furthermore, a device 4 for heating the metering line 2 is provided. The metering line 2 can be heated with the device 4 above a first critical temperature, which is higher than the boiling temperature of water. The device 1 also includes a reservoir (not shown in FIG. 1) which can be flow-connected to the metering line 2. That is to say, in particular, that a fluid stored in the reservoir, such as for example an aqueous solution including at least one reducing agent precursor can, during operation, flow through the metering line 2 to the dispensing opening 3. Through the use of the device 1, a gaseous substance mixture can be provided which contains at least one reducing agent and/or at least one reducing agent precursor.

In the present exemplary embodiment, the device 4 for heating the metering line 2 is wound in spiral fashion together with the metering line 2. In this way, a fluid flowing through the metering line 2 is heated and ultimately evaporated. As a result, a gaseous substance mixture which contains at least one reducing agent precursor is dispensed through the dispensing opening 3. Depending on the selection of the temperature by using the device 4 for heating the metering line 2, at least partial thermolysis of the reducing agent precursor can even already take place in the metering line 2, so that the gaseous substance mixture dispensed through the dispensing opening also already contains reducing agent, such as for example ammonia, in addition to a reducing agent precursor, such as for example urea.

Furthermore, the device 1 for providing a gaseous substance mixture also includes a measuring sensor 5, through the use of which the temperature at least at one point of the metering line 2 can be measured. The measuring sensor 5 can, for example, be a conventional thermal element or a conventional thermoresistor. The device 1 and/or the individual components which require an electrical terminal preferably include a cable length for realizing the electrical terminals. A cable length is to be understood, in particular, to mean a cable connection which is at least half of a meter, preferably at least one meter long. This allows plug-type contacts to be formed in regions which, in particular in automobiles, are exposed to only a small extent to environmental influences such as water spray, stone impacts or the like.

Figure 2:
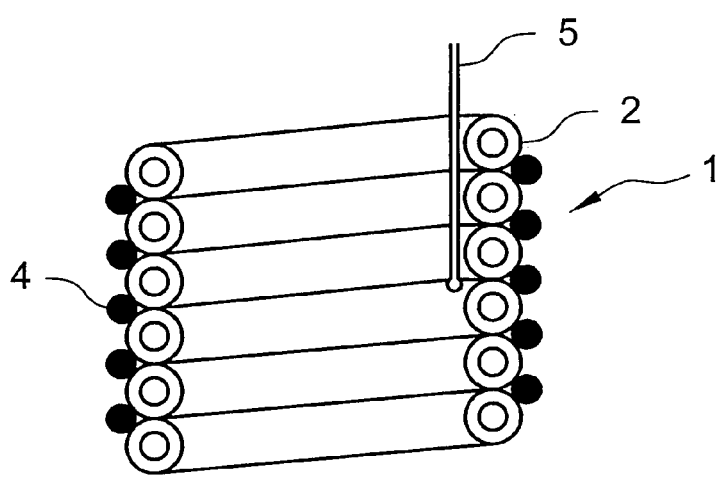
FIG. 2 is an enlarged, longitudinal-sectional view of the first embodiment of the device for providing a gaseous substance mixture.

FIG. 2 shows the device 1 of FIG. 1 in section. It is possible to clearly see the metering line 2, through which the aqueous solution including at least one reducing agent precursor can flow during operation, and the device 4 for heating the metering line 2. The metering line 2 can have a constant cross section, although it can also be variable, as in the present example. In this case, however, the traversable cross section of the metering line 2 is preferably between 0.75 mm$^2$ and 20 mm$^2$ and the traversable cross section is preferably in a region of approximately 3 mm$^2$. The traversable cross sections have been proven to be advantageous since, on one hand, fast and substantially complete evaporation of the aqueous solution is possible with a cross section of that type, and on the other hand, the cross section is large enough to ensure that the formation of depositions in the interior of the metering line 2 is substantially avoided. FIG. 2 also shows the measuring sensor 5 for determining the temperature of the metering line 2.

In this case, the device 4 for heating the metering line 2 is operated in such a way that, in operation, the temperature across the length of the metering line 2 is at most 5° C. above and below a mean temperature. The mean temperature substantially corresponds in this case to the first critical temperature. The metering line 2 is formed, in particular, from a copper alloy.

Figure 3:
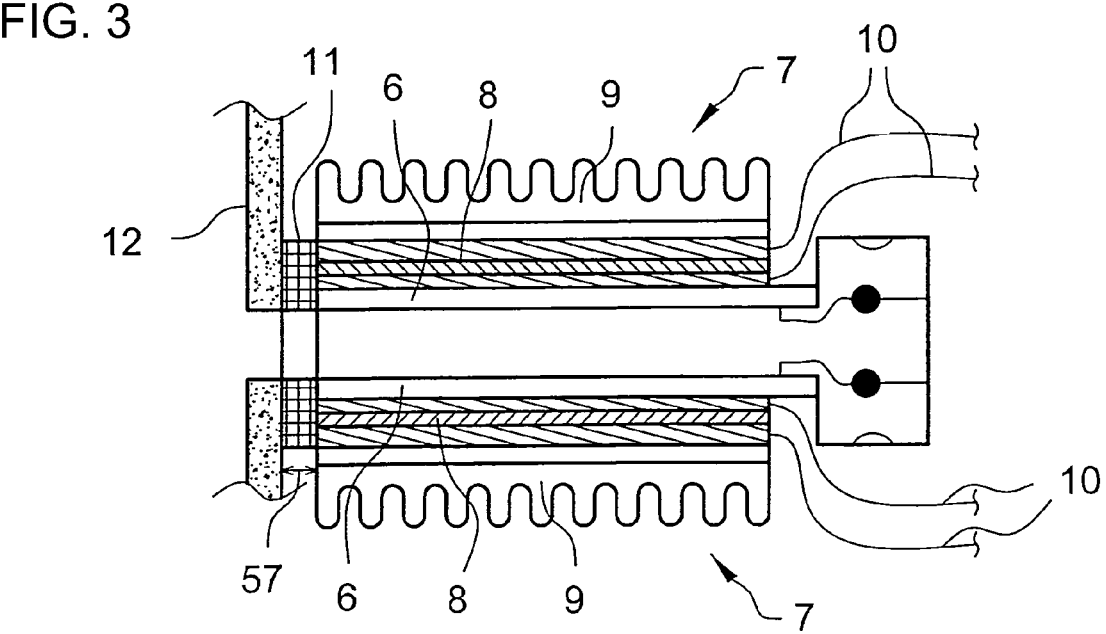
FIG. 3 is a fragmentary, longitudinal-sectional view of a delivery line for delivering an aqueous solution from a reservoir to a metering line.

FIG. 3 diagrammatically shows a delivery line 6, through which the metering line 2 can, in operation, be connected to a reservoir (not shown in FIG. 3). The delivery line 6 has a device 7 for temperature control. In this exemplary embodiment, the device 7 for temperature control includes in each case a plurality of Peltier elements 8 and a cooling body 9. The Peltier elements 8 are in each case provided with electrical terminals 10, through which they can be supplied with current. In this case, depending on the polarity of the current, the Peltier elements 8 are used for heating or for cooling, so that basic temperature control of the delivery line 6 can be obtained with the Peltier elements 8. The cooling body 9 serves, in particular, to radiate heat energy if the delivery line 6 is cooled by the Peltier element or elements 8.

The delivery line 6 can be connected to a further component through the use of a connecting unit 11. Depending on the construction of the device, the component can be the metering line 2 as already referred to above, or generally an evaporator unit 12. The metering line 2 can then be part of the evaporator unit 12. In general, the connecting unit 11 is formed at least partially from a material with a thermal conductivity of less than 10 W/m K (Watt per meter and Kelvin). The connecting unit 11 is formed, in particular, from a ceramic material and/or polytetrafluoroethylene (PTFE). The connecting unit 11 is, in particular, constructed in such a way that a temperature gradient of 40 K/mm (Kelvin per millimeter) and greater can be maintained over a length 57 of the connecting unit 11. This permits a method to be carried out in which the evaporator unit 12 and/or the metering line 2 has a considerably higher temperature than the delivery line 6. The evaporator unit can, for example, have a temperature of 300° C. or more, 400° C. or more or of 420° C. or more, and thereby lead to substantially complete evaporation of the aqueous solution within the evaporator unit 12, while the delivery line 6 has a temperature level of only 70° C. or more, 80° C. or more or 90° C. or more in order to ensure that the aqueous solution is not yet evaporated in the delivery line 6.

Figure 4:
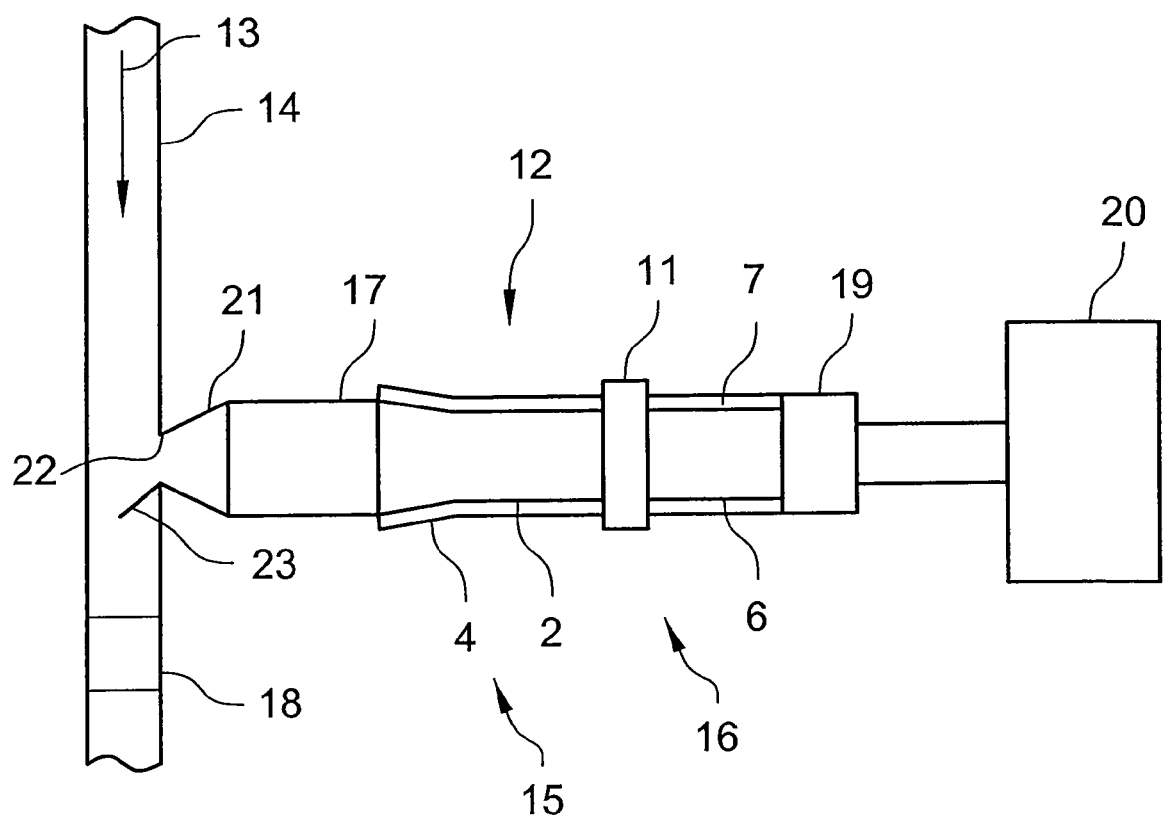
FIG. 4 is a plan view of a device for the selective catalytic reduction of nitrogen oxide in the exhaust gas of an internal combustion engine.

FIG. 4 diagrammatically shows a device 15 for treating exhaust gas 13 of a non-illustrated internal combustion engine. The exhaust gas 13 of the internal combustion engine flows through an exhaust line 14. The device 15 for treating the gases 13 of an internal combustion engine includes a reducing agent solution evaporator 16, a hydrolysis catalytic converter 17 and an SCR catalytic converter 18. An aqueous solution including a reducing agent precursor is evaporated in the reducing agent solution evaporator 16. Urea, in particular, is used as a reducing agent precursor. The reducing agent solution evaporator 16 includes, in this exemplary embodiment, an evaporator unit 12 including a metering line 2 which is heated by a device 4 for heating the metering line 2. The metering line 2 is connected through a connecting unit 11 to a delivery line 6. The delivery line 6 is surrounded by a device 7 for controlling the temperature of the delivery line 6. The device 7 can, for example, include one or more Peltier elements 8 and/or a cooling body 9, as shown above. The aqueous solution of at least one reducing agent precursor can be delivered by a delivery device 19 from a corresponding reservoir 20 into the delivery line 6. In the evaporator unit 12, a gas is provided which includes at least one reducing agent precursor such as, for example urea, and if appropriate also ammonia which has already been generated from the thermolysis of urea. The gaseous substance mixture is introduced into the hydrolysis catalytic converter 17 provided downstream of the reducing agent solution evaporator 16. The hydrolysis catalytic converter 17 is constructed in such a way that, in particular, urea is hydrolyzed to form ammonia through the use of a corresponding catalytically active coating which is applied to the hydrolysis catalytic converter 17. In general, the hydrolysis catalytic converter 17 serves for the hydrolysis of a reducing agent precursor to form a reducing agent. The gas which leaves the hydrolysis catalytic converter 17, which gas contains a reducing agent and is referred to as a reducing agent substance mixture, is metered into the exhaust line 14 through a dosing line 21. The dosing line 21 opens out into the exhaust line 14 at a dosing opening which is situated upstream of the SCR catalytic converter 18. A mixing device 23 in the form of a guide plate, which is provided downstream of the dosing opening 22 and upstream of the SCR catalytic converter 18, causes a mixture of the reducing agent substance mixture with the exhaust gas 13.

The SCR catalytic converter 18 therefore attains a mixture of reducing agent and exhaust gas which leads to a reduction of the nitrogen oxides contained in the exhaust gas 13 in the SCR catalytic converter 18. In this case, a quantity of reducing agent substance mixture is preferably provided which is such that as complete a conversion of the nitrogen oxides in the exhaust gas 13 as possible can take place in the SCR catalytic converter 18.

Figure 5:
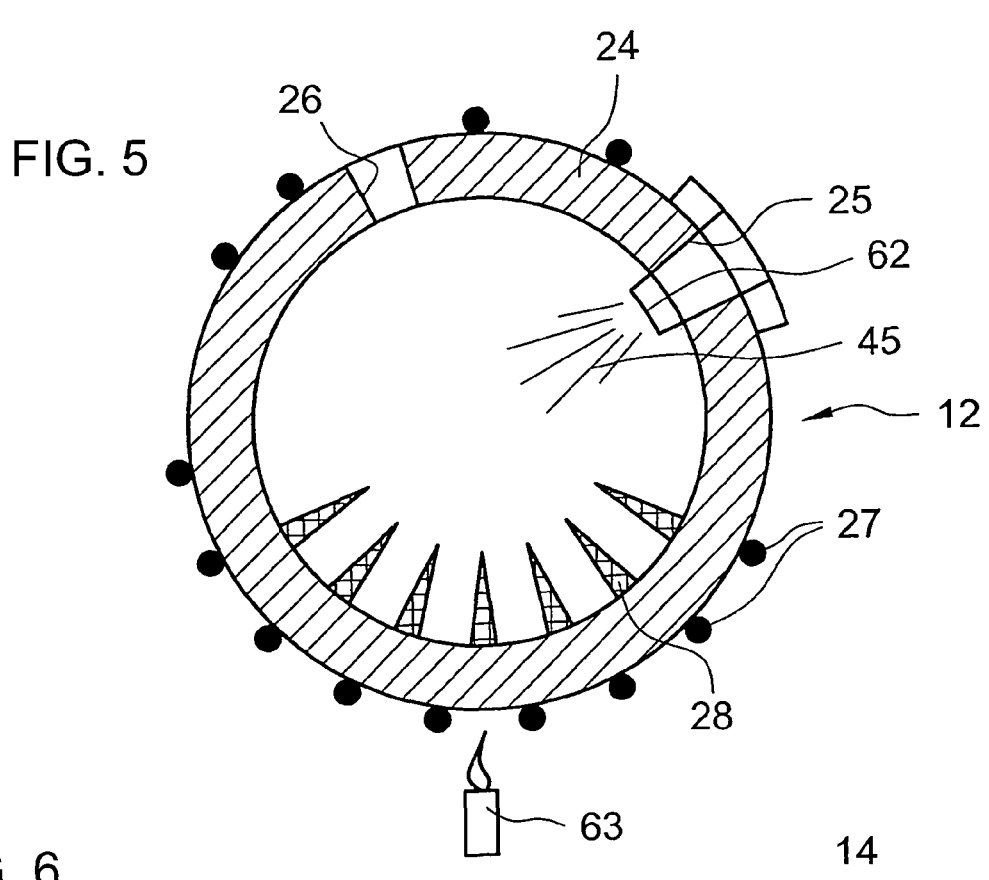
FIG. 5 is a cross-sectional view of a second exemplary embodiment of an evaporator unit.

FIG. 5 diagrammatically shows a further exemplary embodiment of an evaporator unit 12. This illustration shows the evaporator unit 12 in section. The evaporator unit 12 includes an evaporator chamber 24 which encompasses a substantially closed volume. In this exemplary embodiment, the evaporator chamber 24 has merely a first opening 25 for connecting a delivery line 6 (not shown in FIG. 5) for delivering the aqueous solution, and a second opening 26 for connecting a metering line 2 (not shown in FIG. 5) for discharging the gaseous substance mixture. A nozzle 62 is provided in the first opening 25 as a device for dosing an aqueous solution 45 into the evaporator chamber 24. The nozzle 62 serves to dose the aqueous solution 45 into the evaporator chamber 24. The evaporator unit 12 additionally has a device for heating the evaporator chamber 24. In the present exemplary embodiment, the device is formed by corresponding heat conductors 27 which are in contact with the evaporator chamber 24. As is shown in this case, the heat conductors 27 can have an asymmetric construction, that is to say a higher density of heat conductors per unit area is provided in regions which are situated substantially opposite the first opening 25 than in regions which are not situated substantially opposite the first opening 25. Furthermore, the device cumulatively includes a device 63 for burning hydrocarbons, such as for example a burner. A burner of that type can also be suitable for carrying out a flameless combustion of hydrocarbons.

The evaporator chamber 24 is preferably formed from a material including at least one of the following materials: a) copper; b) aluminum; c) noble steel; d) a nickel-based material and e) chrome-nickel steel. The volume of the evaporator chamber 24 is preferably 1.5 to 10 cm$^3$. It is preferable in this case for the evaporator chamber 24 to be formed at least in partial regions from aluminum. In operation, the heat conductor 27 is preferably operated with a heating power of up to approximately one kilowatt per second, with the maximum heating power being fixed as a function of the application. In passenger vehicles, the maximum heating power is preferably approximately 500 to 700 W/s, and in trucks or utility vehicles, preferably approximately 1200 to 1500 W/s. The heat capacity of the evaporator chamber 24 is preferably less than 120 J/K, particularly preferably 100 to 110 J/K. The first opening 25 and the second opening 26 preferably enclose an angle of 30 to 70°. The aqueous solution 45 is preferably delivered at up to 150 ml/min into the evaporator chamber 24, preferably at up to 100 ml/min, particularly preferably at up to 30 ml/min. In the region of the second opening 26, the evaporator chamber 24 preferably has a device with which an infiltration of droplets into the second opening 26 can be avoided. The device is, in particular, a device with which a gas film situated between the droplet and the wall of the evaporator chamber 24 can be penetrated. The device is, in particular, projections of the walls or the like. Structures 28 can likewise be provided in this region.

Furthermore, the evaporator chamber 24 has, in the interior, one or more of the above-mentioned structures 28 which serve to produce a larger surface for evaporating the aqueous solution. The structures 28 are illustrated as being relatively large in the present exemplary embodiment. However, the structures 28 can also be a structured surface which is provided, for example, by applying a corresponding coating to the inner surface of the evaporator chamber 24. The structures 28 can alternatively or additionally also include macroscopic structures which have a structure amplitude of a few millimeters or even more. In general, the structures 28 are to be understood as a device for increasing the wetting capacity of the surface of the evaporator chamber 24.

Figure 6:
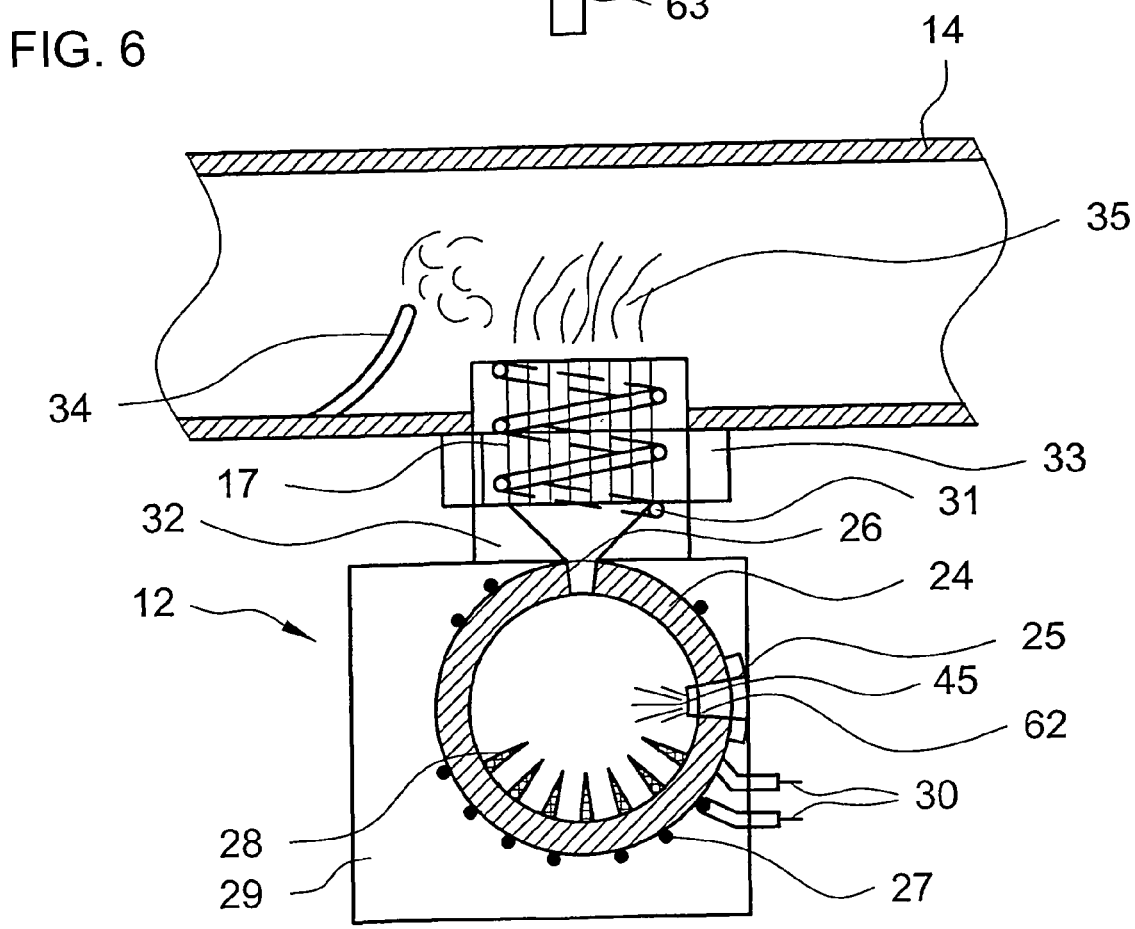
FIG. 6 is a fragmentary, cross-sectional view, on a reduced scale, of a device for providing a reducing agent.

FIG. 6 diagrammatically shows the first exemplary embodiment of the evaporator chamber 24 connected to an exhaust line 14. In this case, the evaporator chamber 24 is provided with a casing 29. The casing 29 is preferably formed from a corresponding thermal insulator which reduces heat losses to the environment. The device 27 for heating the evaporator chamber 24 can be connected through the use of heat conductor terminals 30 to a non-illustrated current source.

The evaporator unit 12 is connected through the use of the second opening 26 to a hydrolysis catalytic converter 17. The hydrolysis catalytic converter 17 has a device 31 for controlling the temperature of the hydrolysis catalytic converter 17. The device 31 is composed, in the present exemplary embodiment, of a corresponding heating wire which is wound around the hydrolysis catalytic converter 17. A corresponding casing 32, which is disposed around the hydrolysis catalytic converter 17 constitutes, in particular, thermal insulation of the hydrolysis catalytic converter 17 with respect to the environment in order to minimize as far as possible any occurring heat losses. In the present exemplary embodiment, the hydrolysis catalytic converter is connected directly to the exhaust line 14 by virtue of projecting into the latter. A corresponding bore, into which the hydrolysis catalytic converter 17 or its casing 32 can be inserted in as sealed a manner as possible, is formed in the exhaust line 14. A corresponding connecting device 33 produces as sealed a connection as possible between the hydrolysis catalytic converter 17 and the exhaust line 14. A passive mixing device is also provided in the form of a guide plate 34, through the use of which a reducing agent substance mixture 35, which leaves the hydrolysis catalytic converter 17, is mixed with the exhaust gas flowing in the exhaust line 14.

In operation, the evaporator unit 12 serves to produce a gaseous substance mixture from an aqueous solution which contains urea as a reducing agent precursor. The gaseous substance mixture generated in the evaporator unit 12 contains at least urea and if appropriate also already ammonia which has been generated by thermolysis of the corresponding urea. The substance mixture is conducted through the second opening 26 into the hydrolysis catalytic converter 17 in which substantially complete hydrolysis of the urea takes place to form ammonia. In this case, a reducing agent substance mixture 35 which includes ammonia is generated in the hydrolysis catalytic converter. A method is particularly preferred in which 98% and more of the urea is ultimately converted to ammonia.

Figure 7:
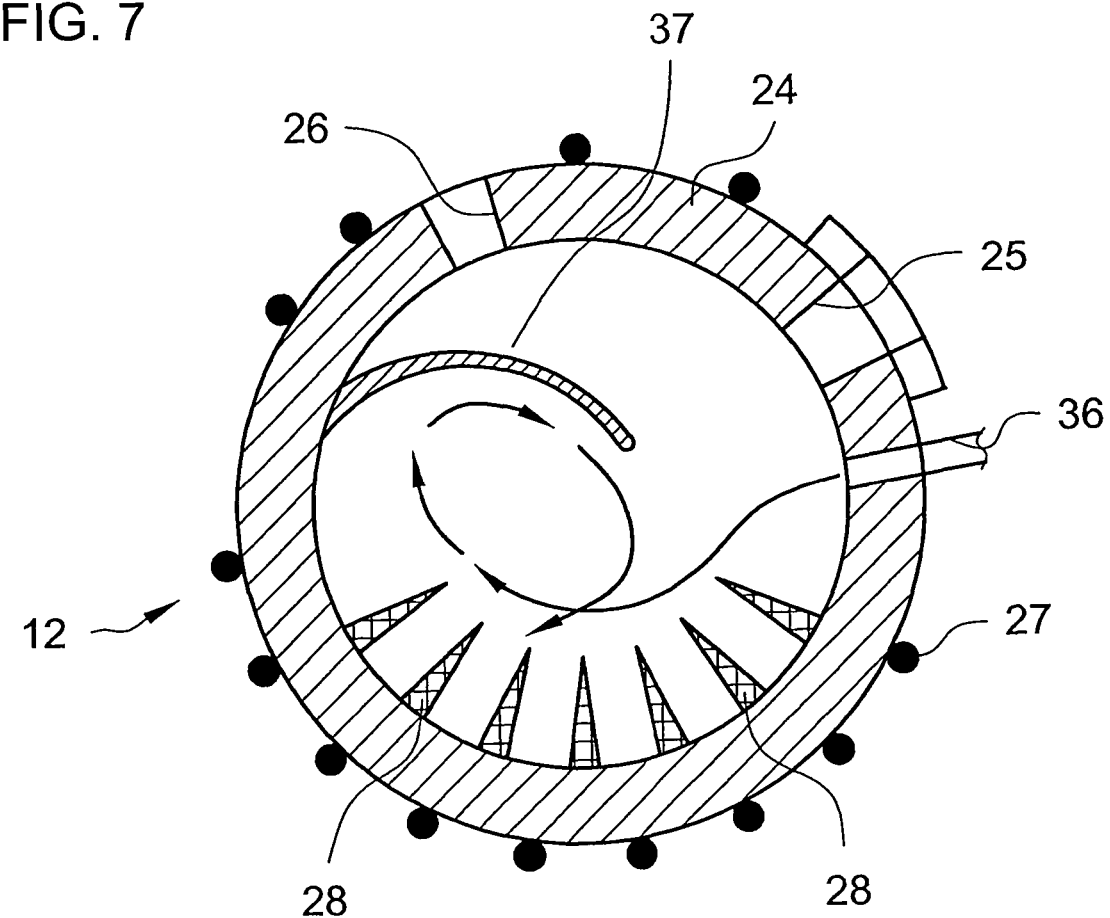
FIG. 7 is a cross-sectional view of an alternative embodiment of the evaporator unit.

FIG. 7 diagrammatically shows an alternative embodiment of the evaporator unit of FIGS. 5 and 6. In contrast to the first exemplary embodiment described above, this alternative embodiment additionally has a third opening 36. In operation, exhaust gas can be introduced into the evaporator chamber 24 in a continuous or pulsatile fashion through the third opening 36. It is possible in this way to obtain an improved distribution of the urea in the generated gas in comparison to the first exemplary embodiment. Furthermore, an evaporator unit 12 of this type can also be used for evaporating solid urea, since water is introduced into the evaporator chamber 24 by the exhaust gases of the internal combustion engine which are introduced through the third opening 36. That water can later be used in the hydrolysis catalytic converter 17 for the hydrolysis of the urea to form ammonia.

Figure 8:
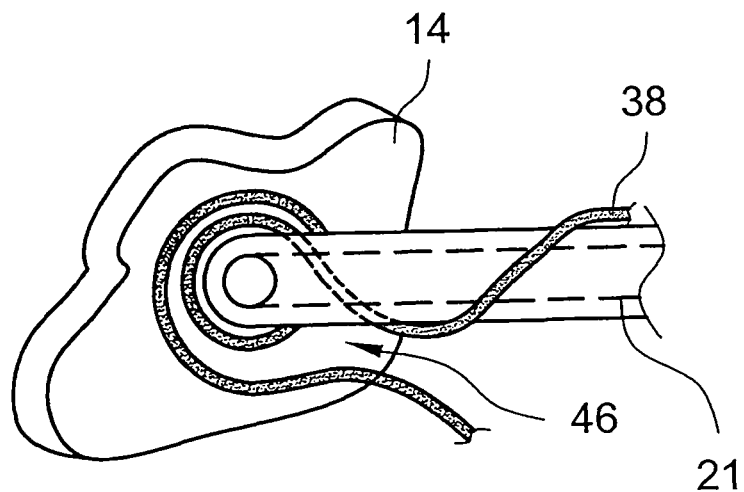
FIG. 8 is a fragmentary, perspective view of a portion of an opening-out point of a dosing line into an exhaust line.

FIG. 8 diagrammatically shows an opening-out point, mouth or orifice of a dosing line 21 into the exhaust line 14 as a part of a corresponding metering unit 46. In this case, the dosing line 21 is surrounded by a heat conductor 38 which is also formed around the opening-out point of the dosing line 21 into the exhaust line 14.

Figure 9:
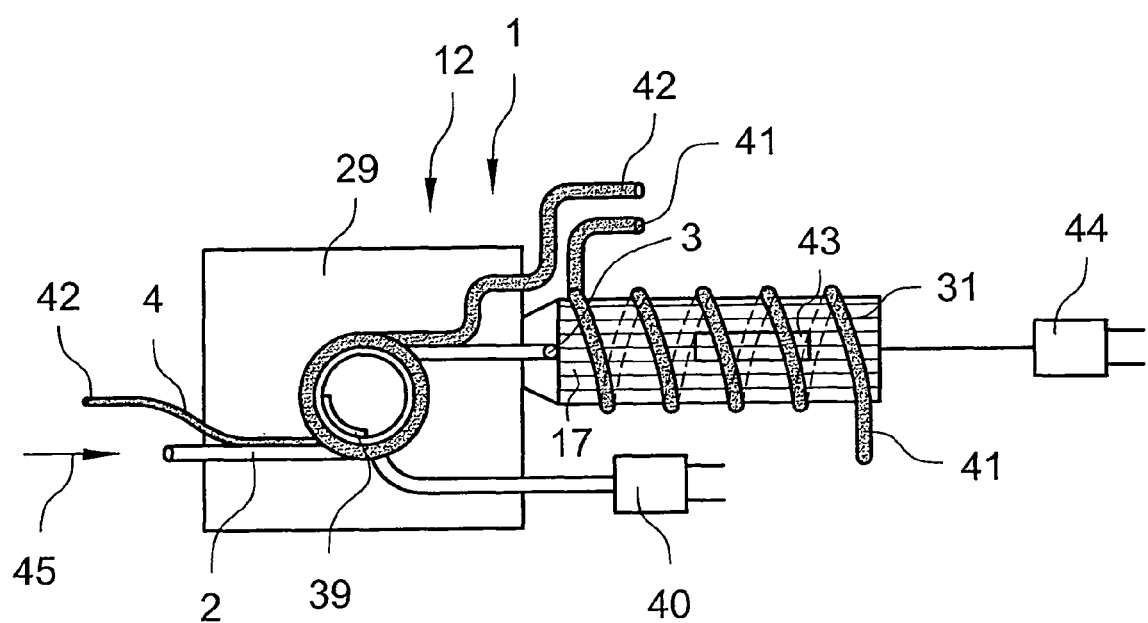
FIG. 9 is a cross-sectional view of an exemplary embodiment of a device for providing a gaseous substance mixture.

FIG. 9 diagrammatically shows, at a first intersection, a further possibility of a device 1 for providing a gaseous substance mixture including a reducing agent. The device 1 includes a metering line 2, around which a corresponding device 4 for heating the metering line 2 is wound, or which is wound together with the device 4. The metering line 2 and the device 4 for heating the metering line 2 are formed together in a common casing 29. A first temperature measuring sensor 39 is formed within the winding of the metering line 2. The first temperature measuring sensor 39 can be connected through the use of a first connecting element 40 to a corresponding control unit (which is not shown in FIG. 9). The evaporator unit 12 is connected at the dispensing opening 3 of the metering line 2 to a hydrolysis catalytic converter 17. The hydrolysis catalytic converter 17 has a coating which catalyses the hydrolysis of urea to form ammonia. The hydrolysis catalytic converter 17 is surrounded by a device 31 for controlling the temperature of the hydrolysis catalytic converter. The device 31 includes a correspondingly formed heating wire. The device 31 for controlling the temperature of the hydrolysis catalytic converter 17 can be connected in an electrically conductive manner to a corresponding power supply through the use of corresponding first heat conductor terminals 41. This correspondingly applies to the device 4 for heating the metering line 2. The device 4 can be provided with a corresponding power supply through the use of corresponding second heat conductor terminals 42. The hydrolysis catalytic converter 17 has a second temperature measuring sensor 43 which can be connected through the use of a corresponding second connecting element 44 to a non-illustrated control unit. The temperature within or on the hydrolysis catalytic converter 17 can be determined through the use of the second temperature measuring sensor 43.

In operation, an aqueous urea solution 45 is delivered into the metering line 2. The device 4 for heating the metering line 2 serves to heat the metering line 2 and thereby evaporate the aqueous urea solution and, if appropriate, depending on the temperature control, an at least partial thermolysis of the contained urea takes place to form ammonia. The corresponding gaseous substance mixture is introduced through the dispensing opening 3 into the hydrolysis catalytic converter 17, in which hydrolysis, preferably substantially complete hydrolysis of the contained urea takes place to form ammonia. A corresponding reducing agent substance mixture 35 leaves the hydrolysis catalytic converter 17. The reducing agent substance mixture 35 can be introduced into an exhaust line 14 of an exhaust system of an internal combustion engine. A method is preferable in this case in which the temperatures of the evaporator unit 12 and/or of the hydrolysis catalytic converter 17 are monitored through the use of the temperature measuring sensors 39, 43, and both components 12, 17 can be heated by the corresponding devices 4, 31.

Figure 10:
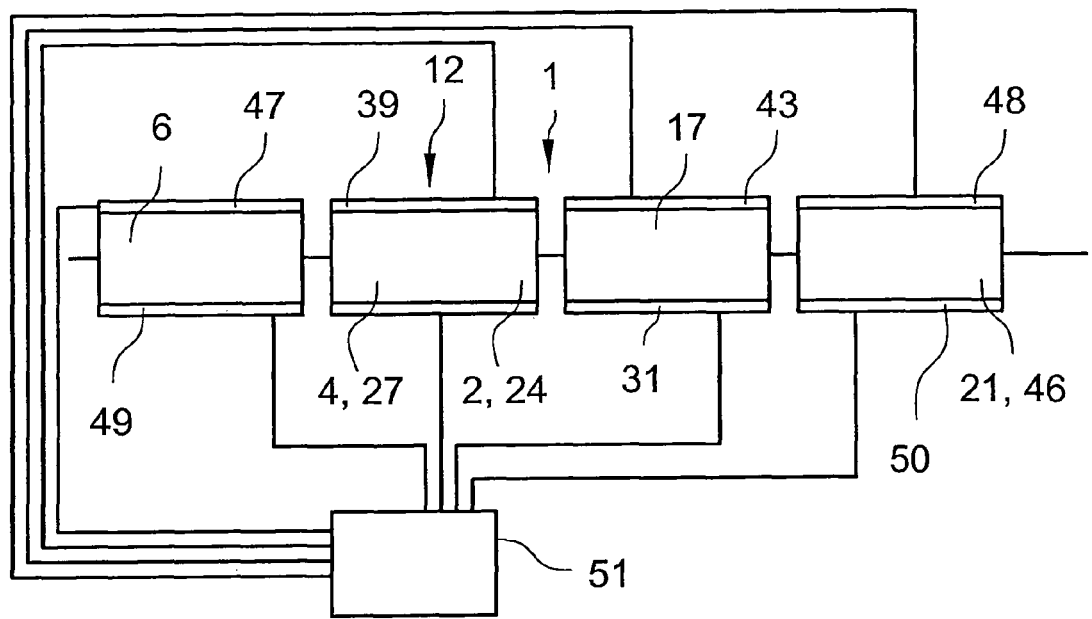
FIG. 10 is a block diagram of a device for providing a gaseous substance mixture.

FIG. 10 diagrammatically shows a device 1 for providing a gaseous substance mixture 35 including at least one reducing agent. The device 1 includes, sequentially, a delivery line 6, through the use of which an aqueous solution is delivered from a non-illustrated reservoir into an evaporator unit 12. The evaporator unit 12 is adjoined by a hydrolysis catalytic converter 17, and the latter is adjoined by a dosing line 21 for metering the corresponding substance mixture to a non-illustrated exhaust line 14 or by a metering unit 46 for metering the reducing agent substance mixture to the exhaust line 14. The evaporator unit 12 has a third temperature measuring sensor 47. The temperature of or in the delivery line 6 can be measured with the third temperature measuring sensor 47. The dosing line 21 and/or the metering unit 46 optionally has a fourth temperature measuring sensor 48, with which the temperature of the dosing line 21 and/or of the metering unit 46 or the temperature in the dosing line 21 and/or in the metering unit 46 can be measured. The evaporator unit 12 has a device 4 for heating the metering line 2 and/or a device 27 for heating the evaporator chamber 24. The hydrolysis catalytic converter 17 can optionally, alternatively or in addition to the device 4, 27, have a device 31 for controlling the temperature of the hydrolysis catalytic converter 17. Optionally, alternatively or in addition, the delivery line 6 has a temperature control device 49, through the use of which the temperature of the delivery line 6 can be controlled. It is particularly possible, advantageous and inventive in this case to use one or more Peltier elements. The dosing line 21 and/or the metering unit 46 have a metering temperature control device 50, through the use of which the temperature of the dosing line 21 and/or of the metering unit 46 can be controlled. The use of at least one Peltier element is also advantageous in this case.

All of the temperature control devices 4, 27, 31, 49, 50 and all of the temperature measuring sensors 39, 43, 47, 48 which are provided are connected to a control unit 51. The control unit 51 carries out a regulation of the temperature in a regulating loop which includes at least one device 4, 27, 31, 49, 50 for temperature control and at least one temperature measuring sensor 39, 43, 47, 48. The number of temperature measuring sensors 39, 43, 47, 48 is preferably greater than the number of devices 4, 27, 31, 49, 50 for controlling the temperature of the components 6, 2, 24, 17, 21, 46. The control unit 51 is preferably connected to a controller of the internal combustion engine or is integrated therein. The data of the controller of the internal combustion engine and the operating parameters of the internal combustion engine can advantageously be incorporated in the control of the evaporation and/or of the delivery to the evaporator unit 12.

Figure 11:
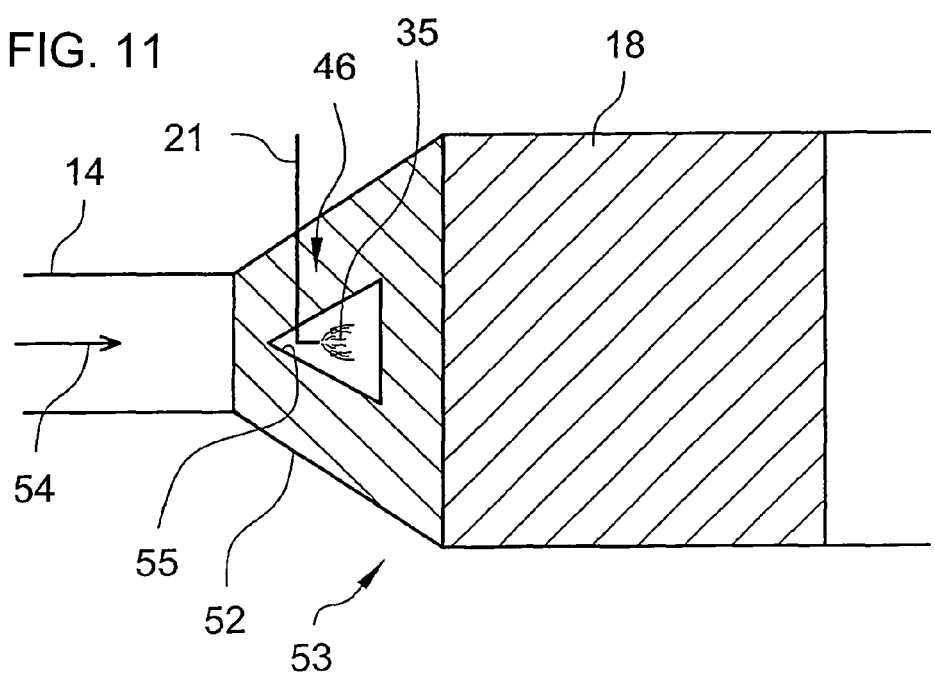
FIG. 11 is a fragmentary, longitudinal-sectional view of an example of a possible metering unit for metering a reducing agent substance mixture to the exhaust gas.

FIG. 11 diagrammatically shows a portion of a device for providing a gaseous substance mixture. A honeycomb body 52 with channels which can be traversed by a fluid, is provided in an exhaust line 14 upstream of an SCR catalytic converter 18. The honeycomb body 52 is part of a corresponding mixing device 53. The honeycomb body 52 is constructed in such a way that it can be traversed by the exhaust gas at least partially at an angle with respect to a main flow direction of the exhaust gas. In this case, the main flow direction 54 is indicated by a corresponding arrow in FIG. 11. In the present exemplary embodiment, the honeycomb body 52 has a conical construction. The honeycomb body has, in particular, a relatively large cutout 55 which is free from channels. The dosing line 21, as part of the metering unit 46, opens out into the cutout 55. The reducing agent substance mixture 35 is introduced through the dosing line 21 in operation.

Figure 12:
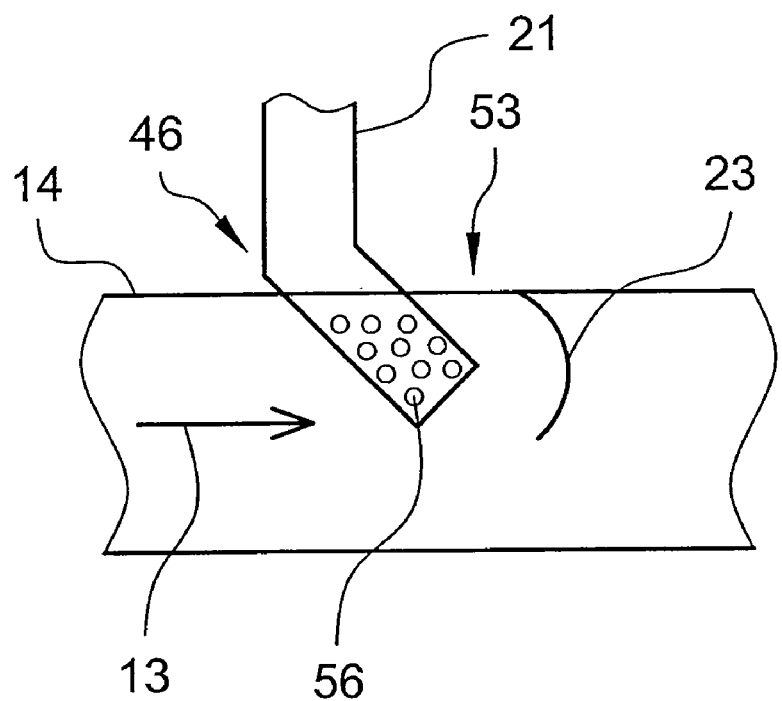
FIG. 12 is a fragmentary, longitudinal-sectional view of a further example of a possible metering unit for metering the reducing agent substance mixture to the exhaust gas.

FIG. 12 diagrammatically shows an example of a metering unit 46 with a dosing line 21 for metering the reducing agent substance mixture into an exhaust line 14. In this case, the dosing line 21 extends through the wall of the exhaust line 14 in a curved state. The dosing line 21 has perforations 56 in a region which projects into the exhaust line 14. In this case, the curvature or the curved entry of the dosing line 21 into the exhaust line 14 is not strictly necessary. The dosing line 21 could equally well enter into the exhaust line 14 perpendicularly or straight. A guide plate 23, which is additionally provided in this case, leads to a further improved mixture of the reducing agent substance mixture with the exhaust gas 13 in the exhaust line 14.

Figure 13:
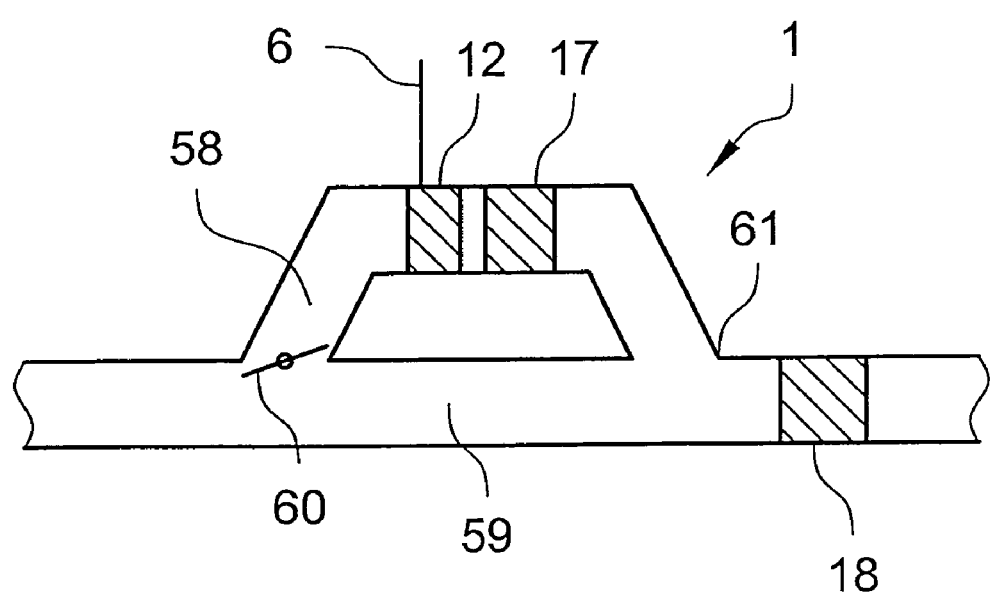
FIG. 13 is a fragmentary, longitudinal-sectional view of an exemplary embodiment of a device for treating the exhaust gas of an internal combustion engine.

FIG. 13 diagrammatically shows an embodiment of the device 1 for treating the exhaust gas of a non-illustrated internal combustion engine. In this case, the evaporator unit 12 and the hydrolysis catalytic converter 17 are provided in a first exhaust branch 58. A distribution of the exhaust gas between the first exhaust gas branch 58 and a second exhaust gas branch 59 is obtained by using a device 60 for flow guidance. The SCR catalytic converter 18 is provided downstream of a mouth or opening-out point 61 of the first exhaust branch 58 into the second exhaust branch 59.

Figure 14:
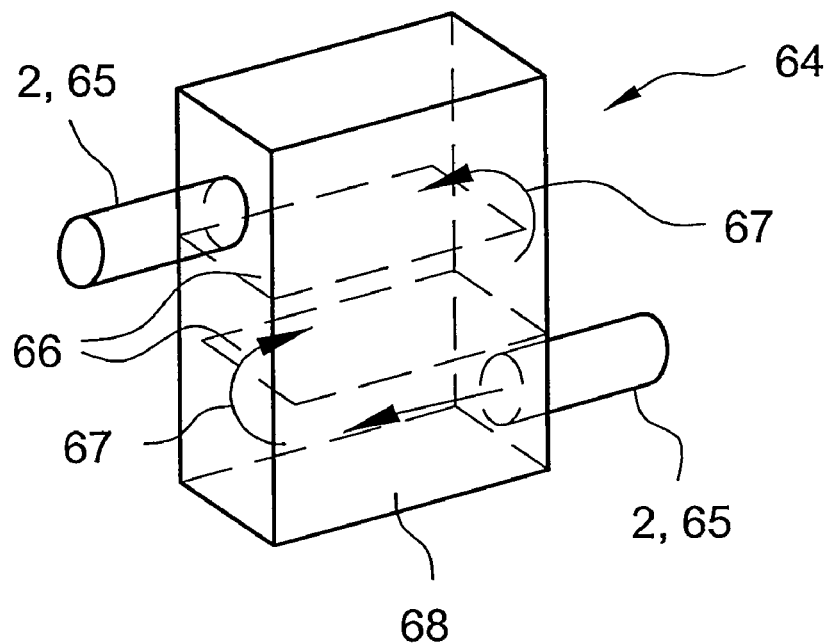
FIG. 14 is a perspective view of a device for depositing droplets.

The evaporator unit 12 preferably has a device 64 for depositing droplets. The device 64 can, for example, be provided within the metering line 2 or in or downstream of the second opening 26 of the evaporator chamber 24. FIG. 14 shows an exemplary embodiment of a device 64 of that type for depositing droplets. The device 64 is connected to the metering line 2 or generally to a line 65 through which vapor passes. Should droplets still be present in the vapor, they are deposited in the present example by the action of inertia. One or more impact plates 66, which force the flow to undergo deflections 67, are provided in the device 64. The impact plate 66 and/or a housing 68 of the device 64 are heated, so that deposited droplets are likewise evaporated. Instead of the device 64 for depositing droplets which is shown in this case, it is also possible to alternatively or cumulatively take other measures. For example, the metering line 2 or the line 65 can have narrowed cross sections, projections, deflections or the like in regions.

Figure 15:
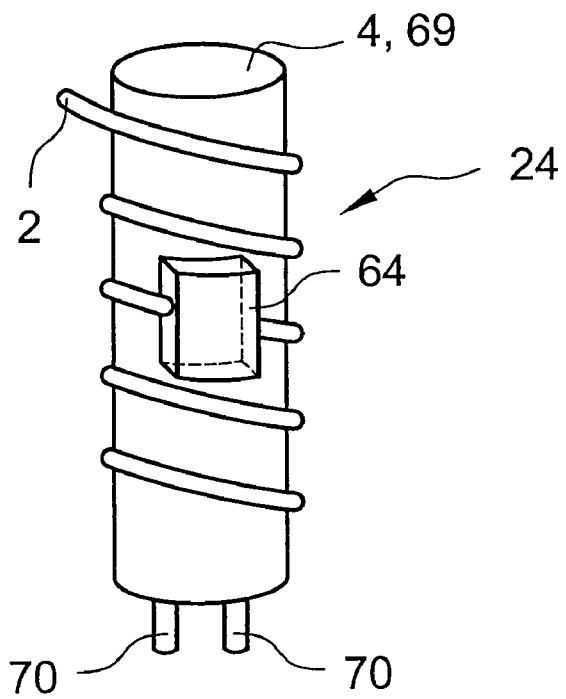
FIGS. 15 to 18 are perspective views of exemplary embodiments of evaporator units.

FIG. 15 diagrammatically shows a further exemplary embodiment of an evaporator unit 12, in which a metering line 2 can be heated by a device 4 for heating the metering line 2. In this case, the device 4 for heating the metering line 2 includes a bar-shaped heating element 69 which can be connected through the use of electrical terminals 70 to a power source. A device 64 for depositing droplets, which is provided in the metering line 2, can be heated due to contact with the rod-shaped heating element 69.

Figure 16:
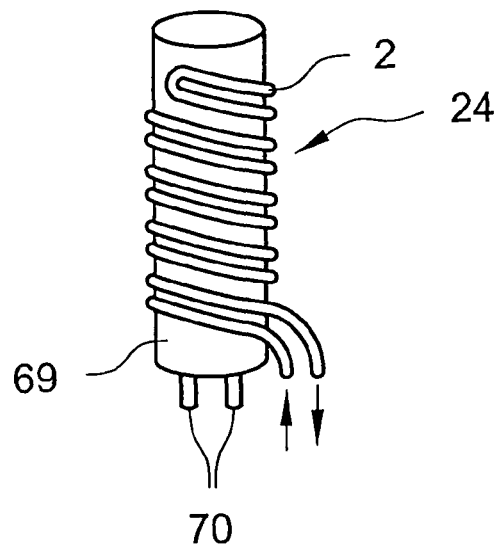

FIG. 16 diagrammatically shows a further exemplary embodiment of an evaporator unit 12 in which the metering line 2 is wound, in the form of a loop, twice around the bar-shaped heating element 69.

Figure 17:
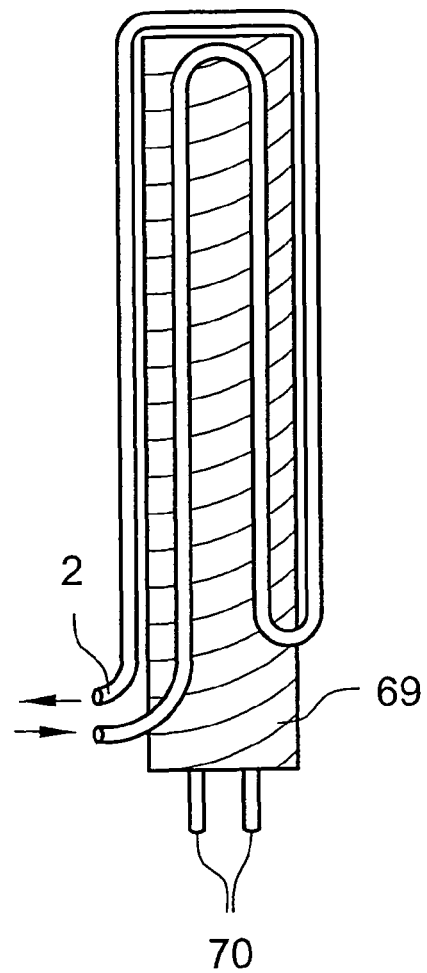
Figure 18:
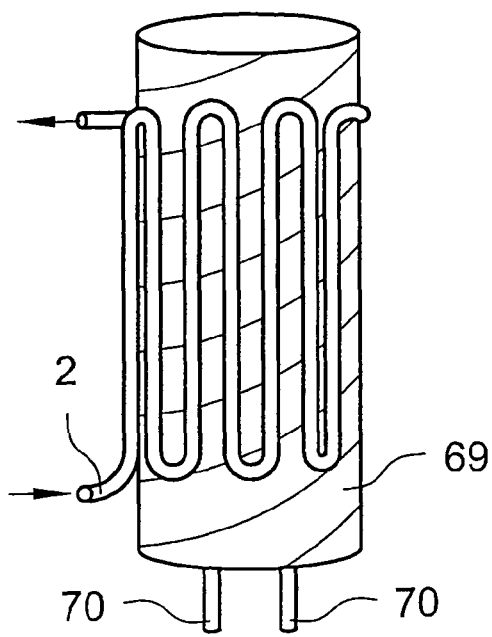

FIGS. 17 and 18 show exemplary embodiments of evaporator units 12 in which the metering line 2 is not wound around the longitudinal axis of the bar-shaped heating element 69 but is fastened in loops to the bar-shaped heating element 69. A materially-joined connection between the metering line 2 and the bar-shaped heating element 69, in particular a brazed connection, is fundamentally preferred.

FIGS. 19 and 20 diagrammatically show a further exemplary embodiment of a device 1 for providing a gaseous substance mixture including at least one of the following substances: a) a reducing agent, preferably ammonia, and b) at least one reducing agent precursor, in particular urea, having a hydrolysis catalytic converter 17. The device 1 includes at least one metering line 2, in the present exemplary embodiment four metering lines 2, which are wound in spiral fashion around a bar-shaped heating element 69. Each of the metering lines 2 has a respective dispensing opening 3, through which, in operation, a gaseous substance mixture which includes a reducing agent, is dispensed. The respective dispensing openings 3 are distributed, so as to be distributed substantially uniformly on a circle. The metering lines 2 are connected to a non-illustrated reservoir 20 from which an aqueous solution 45 of at least one reducing agent precursor is delivered into the metering line 2 by a delivery device 19. The metering lines 2 and the heating element 69 are part of a corresponding reducing agent solution evaporator 16.

The hydrolysis catalytic converter 17, which is disposed downstream of the dispensing openings 3, can likewise be heated by a bar-shaped heating element 69. In one advantageous refinement, only one bar-shaped heating element 69 is provided. The heating element 69 is in thermal contact both with the metering line or lines 2 and with the hydrolysis catalytic converter 17. In the present exemplary embodiment, the hydrolysis catalytic converter 17 is embodied as an annular honeycomb body. The hydrolysis catalytic converter 17 is adjoined downstream by a dosing line 21, through which, in operation, the gas flow including at least one reducing agent can be introduced into the exhaust line 14. A mechanical connection to the exhaust line 14 can be produced by a connecting device 71. A thermal insulation 72 is also provided, through which the hydrolysis catalytic converter 17 is thermally decoupled from the exhaust line 14. A heat shield 73 is also provided, through which the hydrolysis catalytic converter 17 is protected from a radiation of heat. Furthermore, air gap insulation 74, which likewise serves as thermal insulation, is provided between an outer housing 75 and an inner housing 76.

FIG. 20 shows a cross section through that region of the metering lines 2 which can be seen encircling the rod-shaped heating element 69.

Figure 21:
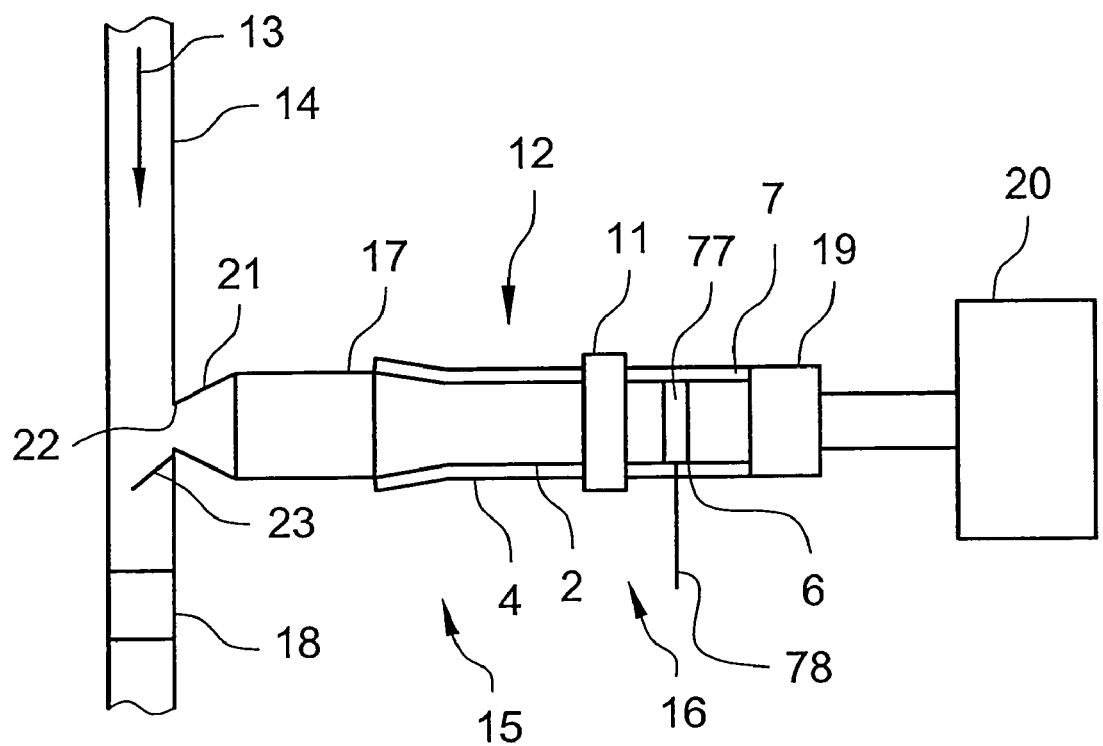
FIG. 21 is a fragmentary, plan view of a further exemplary embodiment of a device for treating exhaust gas.

FIG. 21 diagrammatically shows a further exemplary embodiment of a device 15 for treating exhaust gas 13. In contrast to the embodiment in FIG. 4, a valve 77 is provided in the delivery line 6. The valve 77 serves for dosing the aqueous solution 45 into the evaporator unit 12. The valve 77 can be actuated through the use of a control terminal 78.

Figure 22:
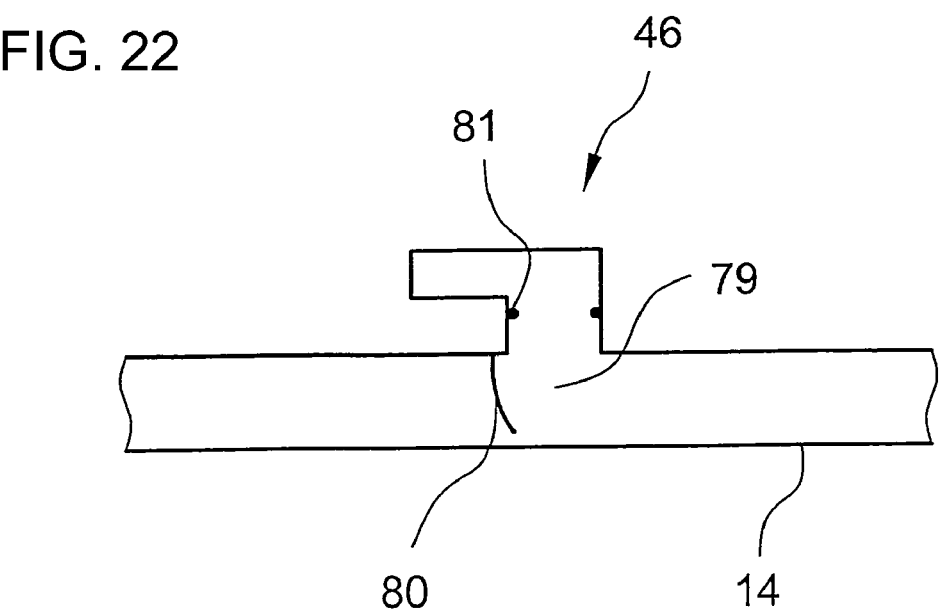
FIG. 22 is a fragmentary, plan view of a portion of an opening-out region of a metering unit into the exhaust line.

FIG. 22 diagrammatically shows an opening-out or mouth region 79 of a metering unit 46 into the exhaust line 14. In this case, the exhaust line 14 and/or the metering unit has a shield or screen 80 which, in operation, produces a dead zone or calming zone of the exhaust gas flow, and consequently a region of reduced pressure, in the opening-out region 79, and thereby ensures that no exhaust gas is pushed into the dosing unit 46. The metering or dosing unit 46 also has a temperature sensor 81 which includes an annular thermoresistor. Should depositions form in the region, then the temperature sensor 81 can be connected to a non-illustrated power source in order to thereby bring about a temperature increase to a second nominal temperature, for example of 550° C. or more, preferably of 600° C. or more, and cause a dissolution or reduction of the depositions.

Figure 23:
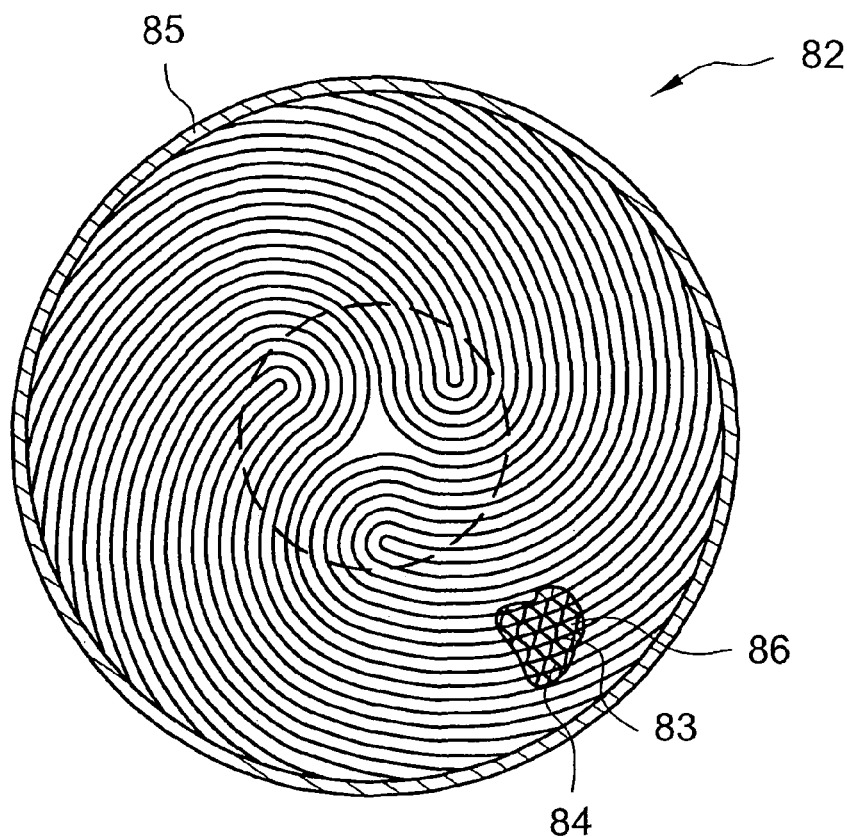
FIGS. 23 and 24 are cross-sectional views of examples of honeycomb bodies acting as catalyst carrier bodies.

FIG. 23 diagrammatically shows a cross section through a honeycomb body 82 which can be used both as a hydrolysis catalytic converter 17 and also as an SCR catalytic converter 18, noting that it is necessary in this case for other catalytically active coatings to be applied. The honeycomb body 82 is constructed from smooth metallic layers or sheets 83 and corrugated metallic layers or sheets 84 which, in this exemplary embodiment, are layered to form three stacks and are then wound with one another. The honeycomb body 82 also includes a casing tube 85 which closes off the honeycomb body 82 from the outside. The smooth layers 83 and corrugated layers 84 form channels 86 through which the exhaust gas 13 can flow.

Figure 24:
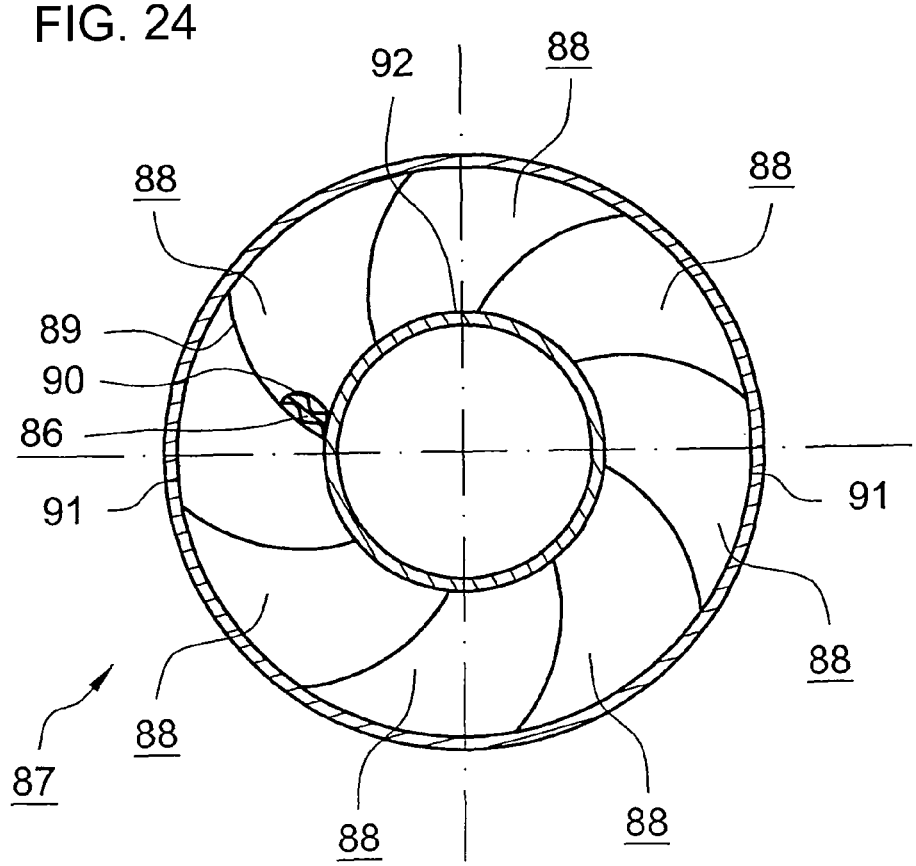

FIG. 24 shows a further example of a honeycomb body 87 which has an annular construction and can be used both as a hydrolysis catalytic converter 17 and also as an SCR catalytic converter 18, noting that it is necessary in this case for other catalytically active coatings to be applied. The honeycomb body 87 is constructed from layers 88 which have smooth sections 89 and corrugated sections 90 that are folded onto one another and form channels 86 through which the exhaust gas 13 can flow. The honeycomb body 87 is closed off through the use of an outer casing tube 91 and an inner casing tube 92.

In the case, in particular, of a metering line 2 which is heated by a device 4, 69, it is fundamentally advantageous to provide heating from the other side, in addition to single-sided heating. It is, for example, possible for further heating elements to be provided which enclose the metering line from the outside. It is fundamentally advantageous if, at a certain cross section of the metering line 2, the temperature over the periphery differs from a mean temperature at most by +25° C. or −25° C. in operation.

The hydrolysis catalytic converter 17 is fundamentally also a tube which is provided with a coating that catalyses the hydrolysis, in particular, of urea to form ammonia, or else a casing tube having at least one structured metallic layer which is applied on the inside to the outer periphery and which preferably has a freely traversable cross section radially in its interior which is at least 20% of the entire cross section of the casing tube. These embodiments are preferably heated from the outside.

Before the provision of a reducing agent upstream of the SCR catalytic converter 18 commences, the process is fundamentally as follows:

it is initially checked as to whether a current supply or fuel supply is ensured for the temperature control and/or heating device 4, 27, 31, 49, 50, 63, 69;

if it is determined that the current and/or fuel supply is ensured, then the evaporator unit 12 and if appropriate the hydrolysis catalytic converter 17 are heated in each case to a predetermined nominal temperature, in particular a metering line 2 is heated to approximately 400 to 450° C. and/or an evaporator chamber 24 is heated to approximately 350 to 450° C.; an aqueous solution 45 is delivered in parallel to the evaporator chamber 24, in particular to the connecting unit 11, with it being possible on one hand for a volume of aqueous solution 45 to be delivered which substantially corresponds to the volume of the delivery line 6, and on the other hand for a corresponding sensor, which operates for example on the basis of conductivity measurement, to be provided at a corresponding point, for example on, in or adjacent the connecting unit 11;

the temperature of the SCR catalytic converter 18 or of the exhaust line 14 is then determined, in particular measured and/or calculated from the data of an engine controller.

If the temperature of the SCR catalytic converter 18 is above a predefinable limit value, in particular the "light-off" temperature of the SCR catalytic converter 18, the evaporator unit 12 is supplied with the aqueous solution 45. If the evaporator unit 12, the metering line 2 and/or the evaporator chamber 24 are still substantially at their operating temperature, then the above-specified diagnosis steps can be omitted.

In operation, the heating power imparted to the evaporator unit 12 correlates with the delivery quantity of the aqueous solution 45. This means, in particular, that it is checked as to what level of nominal heating power is required for the evaporation of the respective delivery quantity. If the measured actual heating power for a timespan is below the nominal heating power, then a warning is output to the user, since a reduction of the cross section of the metering line 2 and/or of the dosing line 21 could then be present.

It is also advantageous, at regular, predefinable time intervals, to heat the evaporator unit 12, the metering line 2, the evaporator chamber 24, the hydrolysis catalytic converter 17, the dosing line 21 and/or the metering unit 46 to a temperature which is above the normal operating temperature, in order to thereby dissolve any depositions which may be present.

When the evaporation is ended, which occurs for example when the internal combustion engine is switched off, the aqueous solution 45 can be returned from the metering line 2. Before the return delivery from the metering line 2, the delivery of aqueous solution 45 is preferably firstly suspended, with the evaporator unit 12, the metering line 2 and/or the evaporator chamber 24 however still being heated to the usual temperature in order to thereby carry out complete evaporation and to thereby prevent any impurities present in the evaporator unit 12, the metering line 2 and/or the evaporator chamber 24 from passing into the delivery line 6 during the return delivery. After a certain time has elapsed, the return delivery can be initiated by the delivery device. A valve is advantageously provided on or adjacent the connecting unit 11. Air can be sucked in during the return delivery through the use of the valve. The return delivery fundamentally takes place until the delivery line 6 is substantially emptied into the reservoir 20.

In the event of intense changes in the delivery quantity of the aqueous solution 45 which is to be delivered, which can for example be attributed to a sharply-rising concentration of nitrogen oxides in the exhaust gas of the internal combustion engine, situations can occur in which the evaporator unit 12 is not capable of immediately evaporating a considerably higher quantity of aqueous solution 45, since the correspondingly increased heating cannot take place so quickly. In this case, it is preferable to increase the delivery quantity of the aqueous solution 45 only to such an extent that complete evaporation is still possible.

The quantity of reducing agent to be dispensed, and consequently also the quantity of aqueous solution 45 which is to be evaporated, can be determined as a function for example, of at least one of the following conditions:

a) the nitrogen oxide concentration in the exhaust gas;
b) a forecast nitrogen oxide generation which preferably occurs when the exhaust gas passes the SCR catalytic converter 18;
c) the maximum quantity of reducing agent which can be converted directly by the SCR catalytic converter 18.

The reservoir 20, the delivery line 6, the evaporator unit 12, the metering line 2, the evaporator chamber 24 and/or the hydrolysis catalytic converter 17 can be constructed to be in thermal contact, for example with the fuel tank of the internal combustion engine. The fuel tank usually has a heater, for frost protection reasons, which can then also provide frost protection for the above-specified components.

A device 15 for treating the exhaust gas of an internal combustion engine is also described. The device 15 includes a reducing agent solution evaporator 16, a hydrolysis catalytic converter 17, which is connected to the reducing agent solution evaporator 16, for the hydrolysis of, in particular, urea to form ammonia, and an SCR catalytic converter 18 for the selective catalytic reduction of nitrogen oxides (NOx). The reducing agent solution evaporator 16 includes an evaporator unit 12 for providing a gaseous substance mixture including at least one of the following substances:
 a) at least one reducing agent precursor, and
 b) a reducing agent.

An aqueous solution 45 including at least one reducing agent precursor can be evaporated through the use of the evaporator unit 12. The SCR catalytic converter 18 is provided in the exhaust line 14, with the reducing agent solution evaporator 16 and the hydrolysis catalytic converter 17 being provided outside of, and in such a way that they can be connected to, the exhaust line 14.

The device 15 can advantageously be refined in such a way that a delivery line 6 for connecting the evaporator unit 12 is connected to a reservoir 20 for the aqueous solution 45. In this case, the delivery line 6 and the evaporator unit 12 are connected to one another through the use of a connecting unit 11. The connecting unit 11 is at least partially made from a material with a thermal conductivity of less than 10 W/m K (Watt per meter and Kelvin), preferably of less than 2 W/m K, particularly preferably of less than 1 W/m K, in particular of 0.2 W/m K. It is also advantageous for the connecting unit 11 to be constructed from at least one material including at least one of the following materials:
 a) a ceramic material, and
 b) polytetrafluoroethylene (PTFE).

It is also advantageous for the connecting unit 11 to be constructed in such a way that a temperature gradient of 40 K/mm (Kelvin per millimeter) and greater can be maintained over a length of the connecting unit 11. In addition, the hydrolysis catalytic converter 17 has a heat capacity of at most 60 J/K (Joule per Kelvin). The volume of the hydrolysis catalytic converter 17 is 100 ml or less.

The hydrolysis catalytic converter preferably includes a casing tube, with the casing tube not being incorporated in the determination of the above-specified heat capacity. At least one at least partially structured metallic layer is preferably provided in the casing tube. A free region without the provision of any at least partially structured layers, is preferably provided in the inner region. The free region encompasses at least 20 or even 50% by area of the cross-sectional area of the casing tube.

The hydrolysis catalytic converter 17 advantageously has a cell density of less than 600 cpsi (cells per square inch), preferably of 400 cpsi and less, particularly preferably of 300, 200 or 100 cpsi and less. The hydrolysis catalytic converter 17 is preferably mechanically connected to the exhaust line 14. The hydrolysis catalytic converter 17 is preferably thermally decoupled from the exhaust line 14.

According to a further advantageous embodiment of the device 15, at least one bar-shaped heating element 69 is provided, through the use of which at least one of the following components can be heated:
 a) the hydrolysis catalytic converter 17, and
 b) at least parts of the evaporator chamber 24.

It is also advantageous that the temperature of at least one of the following components can be controlled:
 a) at least parts of the delivery line 6;
 b) the hydrolysis catalytic converter 17;
 c) at least parts of the evaporator unit 12;
 d) a dosing line 21 for metering the generated ammonia to the exhaust system; and
 e) a metering unit 46, through the use of which the hydrolysis catalytic converter 17 can be connected to the exhaust gas line 14.

It is also advantageous that a device 4, 7, 27, 31, 49, 50 for temperature control is provided and the device includes at least one of the following components:
 a) a heating wire;
 b) a Peltier element 8;
 c) a cooling body 9;
 d) a bar-shaped heating element 69; and
 e) a device 63 for burning a fuel.

It is also advantageous that at least one of the following components has a coating which catalyses the hydrolysis of urea:
 a) at least parts of the connecting unit 11;
 b) b) at least parts of a metering line 2 for metering the gaseous substance c mixture to the hydrolysis catalytic converter 17;
 c) at least parts of the evaporator unit 12;
 d) at least parts of a dosing line 21 for metering the generated reducing agent to the exhaust system; and
 e) at least parts of a metering line 46, through the use of which the hydrolysis catalytic converter 17 can be connected to the exhaust line 14.

It is also advantageous that a metering unit 46 is provided, through the use of which the hydrolysis catalytic converter 17 can be flow-connected to an exhaust line 14 of the internal combustion engine. The metering unit 46 includes, in particular, a passive mixing device, through the use of which the introducible substances can be mixed with the exhaust gas. The mixing device preferably includes at least one of the following components:
 a) a guide plate 34; and
 b) a honeycomb body 52 which is constructed in such a way that the exhaust gas 13 can flow through it at least partially at an angle with respect to the main flow direction 45 of the exhaust gas.

The honeycomb body 52 advantageously has channels and apertures which can be traversed by a fluid and connect adjacent channels to one another.

In one advantageous refinement of the device 15, at least one of the following components:
 a) the metering unit 46; and
 b) the exhaust line 14;
is constructed in such a way that, in operation, the opening-out region of the metering unit 46 into the exhaust line 14 forms a flow calming zone or dead zone.

According to a further advantageous embodiment of the device 15, thermal insulation 72 is provided downstream of the hydrolysis catalytic converter 17. The thermal insulation 72 is preferably disposed directly adjacent the hydrolysis catalytic converter 17.

According to a further advantageous embodiment of the device 15, at least one of the following components has at least one temperature sensor:
 a) the metering unit 46;
 b) the hydrolysis catalytic converter 17;
 c) the SCR catalytic converter 18;
 d) the evaporator unit 12;
 e) the metering line 2;

f) the evaporator chamber 24; and g) a dosing line 21 for metering the generated reducing agent to the exhaust line 14.

The temperature sensor can preferably be connected to a power supply, so that it can also be used for heating the corresponding component a) to g).

According to a further advantageous embodiment of the device 15, a delivery device 19 is provided, through the use of which the aqueous solution 45 can be delivered from a reservoir to the evaporator unit 12. The delivery device 19 preferably includes at least one pump, preferably a delivery pump. According to one advantageous embodiment, the pump can build up a delivery pressure which is greater than the highest possible exhaust gas pressure on the metering unit 46 and/or on the dosing line 21 during operation of the internal combustion engine. According to a further advantageous embodiment of the device 15, at least one valve for dosing the aqueous solution 45 is provided between the delivery device 19 and the evaporator unit 12.

An advantageous method for treating the exhaust gas of an internal combustion engine is also to be described in this case. The method includes at least the following steps:

a) providing at least one of the following substances:
   a1) reducing agent; and
   a2) gaseous substance mixture including at least one reducing agent precursor;

b) hydrolysis of the at least one reducing agent precursor, with a reducing agent substance mixture 35 being obtained; and c) subjecting an SCR catalytic converter 18 to the reducing agent substance mixture 35 and the exhaust gas 13 for the at least partial selective catalytic reduction of nitrogen oxides (NOx) contained in the exhaust gas.

A mixture of the reducing agent substance mixture 35 with at least parts of the exhaust gas 13 takes place after step b).

The method can advantageously be refined in such a way that, in step a), an evaporation of an aqueous solution 45 including at least one reducing agent precursor takes place in an evaporator unit 12. It is also preferable that step b) at least partially takes place in a hydrolysis catalytic converter 17.

According to a further advantageous embodiment of the method, the temperature of at least one of the following components is regulated:

a) at least parts of the evaporator unit 12;
b) the hydrolysis catalytic converter 17;
c) a delivery line 6 for delivering the aqueous solution 45;
d) a metering line 2 for metering the gaseous substance mixture to the hydrolysis catalytic converter 17;
e) a dosing line 21 for metering the generated reducing agent to the exhaust system; and
f) a metering unit 46, through the use of which the hydrolysis catalytic converter 17 can be flow-connected to an exhaust gas line 14 of the internal combustion engine.

In this case, the connection is provided upstream of the SCR catalytic converter 18. It is also advantageous that the temperature of at least one of the following components is controlled:

a) at least parts of the evaporator unit 12;
b) the hydrolysis catalytic converter 17;
c) a delivery line 6 for delivering aqueous solution 45 to an evaporator unit 12;
d) a metering line 2 for metering the gaseous substance mixture to the hydrolysis catalytic converter 17;
e) a dosing line 21 for metering the generated reducing agent to the exhaust line 14; and
f) a metering unit 46, through the use of which the hydrolysis catalytic converter 17 can be flow-connected to an exhaust gas line 14 of the internal combustion engine.

In this case, the connection is provided upstream of the SCR catalytic converter 18. It is also advantageous that the temperature of at least one of the following components is controlled:

a) at least parts of the evaporator unit 12;
b) the hydrolysis catalytic converter 17;
c) a delivery line 6 for delivering aqueous solution 45 to an evaporator unit 12;
d) a metering line 2 for metering the gaseous substance mixture to the hydrolysis catalytic converter 17;
e) a dosing line 21 for metering the generated reducing agent to the exhaust system; and
f) a metering unit 46, through which the hydrolysis catalytic converter 17 can be flow-connected to an exhaust line 14 of the internal combustion engine.

A further embodiment of the method includes the delivery of the aqueous solution 45 through a delivery line 6 to the reducing agent solution evaporator 16. It is advantageous in this case if the aqueous solution 45 can be returned through the delivery line 6. According to a further advantageous embodiment of the method, up to 2.5 ml of aqueous solution 45 are evaporated within one second.

According to a further advantageous embodiment of the method, the temperature of at least one of the following components is determined before the start of a temperature control measure:

a) the hydrolysis catalytic converter 17;
b) the evaporator unit 12;
c) a dosing line 21 for metering the generated reducing agent to the exhaust line 14; and
d) a metering unit 46, through the use of which the hydrolysis catalytic converter 17 can be flow-connected to the exhaust line 14 of the internal combustion engine, and is aligned with at least one further temperature of another component. According to a further advantageous embodiment of the method, the evaporation of the aqueous solution 45 takes place only if the temperature alignment results in the determined temperature level and the temperature of the other component differing at most by a predefinable difference value.

According to a further advantageous aspect, a device 1 is proposed for providing a gaseous substance mixture including at least one of the following substances:

a) at least one reducing agent, and
b) at least one reducing agent precursor.

In this case, the device 1 includes a reservoir 20 for an aqueous solution 45 including at least one reducing agent precursor. The aqueous solution 45 can be delivered by a delivery device 19 from the reservoir 20 into at least one metering line 2 with a discharge opening 3. A device 4 for heating the metering line 2 is advantageously provided, with which device 4 the at least one metering line 2 can be heated above a critical temperature that is greater than the boiling temperature of water. That temperature is preferably 350° C. or more, preferably 400° C. or more, in particular 410 to 430° C. One advantageous refinement of the device 1 provides that the delivery device 19 includes at least one pump. The pump is preferably a dosing pump. According to a further advantageous refinement of the device, a valve for dosing the quantity of aqueous solution 45 is provided between the delivery device 19 and the metering line 2. The device 4 for heating also advantageously includes at least one of the following elements:

a) an electrical resistance heater;
b) a heat-exchanging device for utilizing the waste heat of at least one other component;
c) at least one Peltier element; and
d) a device for burning a fuel.

A further advantageous refinement of the device is distinguished in that the device 1 is constructed in such a way that, in operation, the temperature across the length of the metering line 2 is at most 25° C. above and below a mean temperature.

A further advantageous refinement of the device is distinguished in that the metering line 2 has a traversable cross section of at most 20 mm$^2$. It is also advantageous if the metering line 2 is formed from a material including at least one of the following substances:
a) copper;
b) aluminum;
c) a nickel-based material;
d) chrome-nickel steel; and
e) noble steel.

The metering line 2 has, in particular, a length of 0.1 to 5 m, preferably a length of 0.3 to 0.7 m, particularly preferably substantially 0.5 m. The metering line 2 preferably has a wall thickness of 0.1 to 0.5 mm. The metering line 2 preferably has a heat capacity of at least 150 J/K (Joule per Kelvin).

According to one advantageous refinement of the device 1, the metering line 2 and the device 4 for heating the metering line 2 have, in at least one partial region, at least one of the following configurations with respect to one another:
a) the metering line 2 and device 4 for heating the metering line 2 are provided coaxially with respect to one another at least in one partial region;
b) the metering line 2 and device 4 for heating the metering line 2 are provided concentrically with respect to one another at least in one partial region;
c) the metering line 2 and device 4 for heating the metering line 2 are disposed adjacent one another at least in one partial region;
d) the metering line 2 is formed, at least in one partial region, so as to be wound around the device 4 for heating the metering line 2;
e) the device 4 for heating the metering line 2 is formed, at least in partial regions, by a bar-shaped heating element 69 around which the metering line 2 is wound;
f) the metering line 2 forms a channel or duct in a bar-shaped heating element 69.

According to a further advantageous refinement of the device 1, the metering line 2 and the device 4 for heating the metering line 2 are cohesively connected to one another at least in partial regions. A cohesive connection is to be understood in particular to mean a soldered, brazed and/or welded connection.

According to a further advantageous refinement of the device 1, the metering line 2 is provided at least partially with a coating which catalyzes the hydrolysis of a reducing agent precursor to form a reducing agent. The device 1 preferably includes at least one measuring sensor 5 for determining the temperature of the metering line 2. The measuring sensor can preferably be connected to a power source 5 in order to thereby allow the metering line 2 to be heated above the critical temperature, for example within the context of an emergency program.

An advantageous method is also described for providing a gaseous substance mixture including at least one of the following substances:
a) at least one reducing agent, and
b) at least one reducing agent precursor.

In this case, an aqueous solution 45 of at least one reducing agent precursor is delivered from a reservoir 20 into a metering line 2. In this case, the metering line 2 is heated in such a way that the aqueous solution 45 is completely evaporated to form the gaseous substance mixture. In this case, complete is to be understood in particular to mean an evaporation in which 90% by weight and more, preferably 95% by weight and more, particularly preferably 98% by weight of the aqueous solution is evaporated. One advantageous refinement of the method is aimed at least at one of the reducing agent precursors:
a) urea, and
b) ammonium formate,
being included in at least one of the following components:
A) the substance mixture, and
B) the aqueous solution.

It is also advantageous that the temperatures in the metering line 2 are at a mean temperature of between 380° C. and 450° C. The temperature across a length of the metering line 2 is preferably at most 25° C. above or below a mean temperature, preferably a mean temperature of 380° C. to 450° C.

According to a further advantageous refinement of the method, a heating power is used during the heating which varies by up to 500 W/s. A quantity of 0.5 ml/s of the aqueous solution 45 is preferably delivered into the metering line 2. It is also preferable for the metering line 2 to have a traversable cross section of at most 20 mm$^2$. The metering line 2 is preferably heated to a second temperature which is greater than the critical temperature at which a complete evaporation of the aqueous solution 45 takes place, in order to thereby break up any deposits which may be present.

According to a further advantageous refinement of the method, the temperature of the metering line 2 is determined before the start of the evaporation, and is calibrated with other known temperatures. These may, for example, be other known or measured temperatures in the automobile, such as for example the external temperature measured through the use of an external temperature sensor, or the cooling water temperature.

According to a further advantageous refinement of the method, the heating of the metering line 2 takes place through the use of an electrical resistance heater, with the resistance of the resistance heater being determined before the start of the heating, and a heating of the metering line taking place according to the determined resistance. One further advantageous refinement of the method is aimed at monitoring the heating power which is introduced during the heating of the metering line 2. According to a further advantageous refinement of the method, the heating is interrupted if, over a predefinable time period, the heating power remains below a value which is dependent on the quantity of aqueous solution which is to be evaporated.

The device 1 according to the invention and the method according to the invention advantageously permit the provision or preparation of a reducing agent for the selective catalytic reduction of nitrogen oxides in the exhaust gas of an internal combustion engine. The preferred construction of the evaporator unit 12 as an evaporator chamber 24 and of the hydrolysis catalytic converter 17 outside the exhaust system advantageously permits a small configuration of the hydrolysis catalytic converter 17, and therefore a compact construction.

The invention claimed is:

1. A method for providing a gaseous substance mixture including at least one of the following substances:
a) at least one reducing agent, or
b) at least one reducing agent precursor, the method comprising the following steps:

delivering an aqueous solution of at least one reducing agent precursor into an evaporator chamber in droplet form;

heating the evaporator chamber to completely evaporate the aqueous solution to form the gaseous substance mixture; and the evaporator chamber includes a volume and only two openings, a first opening for connecting a delivery line for the aqueous solution, and a second opening for connecting a metering line for discharging the gaseous substance mixture.

2. The method according to claim 1, which further comprises carrying out the heating step by heating the evaporator chamber with an electrical resistance heater.

3. The method according to claim 1, which further comprises carrying out the heating step by heating the evaporator chamber to a mean temperature of 350 to 450° C.

4. The method according to claim 1, which further comprises carrying out the heating step by heating the evaporator chamber to a mean temperature which is not deviated from at any location of the evaporator chamber by more than +25° C. or −25° C.

5. The method according to claim 1, which further comprises carrying out the heating step by heating the evaporator chamber with a heating device.

6. The method according to claim 5, which further comprises:

forming the heating device with heat conductors disposed in regions substantially opposite the first opening; and enclosing an angle of 30° to 70° between the first and second openings.

7. The method according to claim 1, which further comprises carrying out the step of discharging the gaseous substance mixture by forcing the gaseous substance mixture out of the evaporator chamber under pressure.

8. The method according to claim 1, wherein no exhaust gas is present in the evaporator chamber.

9. The method according to claim 1, wherein said volume is closed except for said first and second openings.

* * * * *